US012720591B2

(12) United States Patent
Feng et al.

(10) Patent No.: US 12,720,591 B2
(45) Date of Patent: Aug. 25, 2026

(54) USER EQUIPMENT, BASE STATION, AND METHOD FOR IDENTIFYING USER EQUIPMENT

(71) Applicant: JRD COMMUNICATION (SHENZHEN) LTD., Shenzhen (CN)

(72) Inventors: Aijuan Feng, Shenzhen (CN); Jia Sheng, Shenzhen (CN)

(73) Assignee: JRD COMMUNICATION (SHENZHEN) LTD., Shenzhen (CN)

(*) Notice: Subject to any disclaimer, the term of this patent is extended or adjusted under 35 U.S.C. 154(b) by 437 days.

(21) Appl. No.: 18/247,479

(22) PCT Filed: Oct. 16, 2020

(86) PCT No.: PCT/CN2020/121665
§ 371 (c)(1),
(2) Date: Mar. 31, 2023

(87) PCT Pub. No.: WO2022/077488
PCT Pub. Date: Apr. 21, 2022

(65) Prior Publication Data

US 2023/0422296 A1 Dec. 28, 2023

(51) Int. Cl.
*H04W 74/02* (2009.01)
*H04W 8/24* (2009.01)
(Continued)

(52) U.S. Cl.
CPC ............ *H04W 74/02* (2013.01); *H04W 8/24* (2013.01); *H04W 74/0833* (2013.01); *H04W 74/0836* (2024.01); *H04W 74/0838* (2024.01)

(58) Field of Classification Search
CPC ... H04W 74/02; H04W 74/0833; H04W 8/24; H04W 74/0836; H04W 74/0838; H04W 48/12
See application file for complete search history.

(56) References Cited

U.S. PATENT DOCUMENTS

2020/0288506 A1 9/2020 Lei et al.
2020/0314913 A1 10/2020 Rastegardoost et al.
(Continued)

FOREIGN PATENT DOCUMENTS

CN 107660347 A 2/2018
CN 111345072 A 6/2020
(Continued)

OTHER PUBLICATIONS

International Search Report in International application No. PCT/CN2020/121665, mailed on Jul. 14, 2021.
(Continued)

*Primary Examiner* — Congvan Tran
(74) *Attorney, Agent, or Firm* — PV IP PC; Wei Te Chung

(57) ABSTRACT

A user equipment (UE), a base station, and methods of identifying the UE are provided. The method of identifying the UE performed by the UE includes determining, by the UE from the base station, a configuration associated with the UE and performing, by the UE, a random access (RA) procedure using the configuration associated with the UE, wherein a UE type of the UE is identified in the RA procedure by the base station. This can solve issues in the prior art, reach early identification of the UE, realize coverage compensation, provide different schedules for different UE types, provide a good communication performance, and/or provide high reliability.

20 Claims, 11 Drawing Sheets

(51) Int. Cl.

| | |
|---|---|
| ***H04W 74/0833*** | (2024.01) |
| *H04W 74/0836* | (2024.01) |
| *H04W 74/0838* | (2024.01) |

(56) References Cited

U.S. PATENT DOCUMENTS

| | | | | |
|---|---|---|---|---|
| 2023/0060894 | A1 * | 3/2023 | Rastegardoost | H04B 7/0695 |
| 2024/0008050 | A1 * | 1/2024 | Zhou | H04W 72/231 |
| 2024/0015796 | A1 * | 1/2024 | Fehrenbach | H04W 8/24 |
| 2024/0022897 | A1 * | 1/2024 | Wu | H04W 8/24 |

FOREIGN PATENT DOCUMENTS

| | | | |
|---|---|---|---|
| CN | 111567126 | A | 8/2020 |
| CN | 111713136 | A | 9/2020 |
| EP | 3180955 | B1 | 8/2019 |
| EP | 4096291 | A1 | 11/2022 |
| EP | 4117378 | A1 | 1/2023 |
| KR | 20170031844 | A | 3/2017 |
| WO | 2019149894 | A1 | 8/2019 |
| WO | 2019220210 | A1 | 11/2019 |

OTHER PUBLICATIONS

Written Opinion of the International Search Authority in International application No. PCT/CN2020/121665,mailed on Jul. 14, 2021.

NEC. "Constraint on usage of RedCap functions" 3GPP TSG-RAN WG2 #111e R2-2006979, URL: http://www.3gpp.org/ftp/tsg_ran/WG2_RL2/TSGR2_111-e/Docs, Aug. 7, 2020 (Aug. 7, 2020), sections1-3.

Intel Corporation. "Summary of [109][REDCAP] Reduced Capability signalling framework(Intel)" 3GPP TSG-RAN WG2 Meeting #111 electronic R2-2008191, URL: https://www.3gpp.org/ftp/tsg_ran/WG2_RL2/TSGR2_111-e/Docs, Sep. 7, 2020 (Sep. 7, 2020), sections 1-3.

Chinese Office Action issued in corresponding Chinese Patent Application No. 202080106342.5 dated Jan. 22, 2025, pp. 1-10.

NPL1: 3GPP tsg ran\wg2 rl2, tsgr2 111-e, Aug. 7, 2020, ZTE Corporation, Sanechips, R2-2006904, "Identification and access control for Redcap UE".

Chinese Office Action issued in corresponding Chinese Patent Application No. 202080106342.5 dated Aug. 19, 2024, pp. 1-9.

ZTE Corporation, Sanechips, R2-2006904 Identification and access, 3GPP tsg_ran\wg2_rl2,tsgr2_111-e, Aug. 7, 2020(Aug. 7, 2020).

"draft_r1-200xxxx—redcap_others_summary_v 038_moderator_cmcc" 3GPP tsg_ran\wg1_rl1, Aug. 25, 2020 (Aug. 25, 2020).

Moderator (Intel Corporation): "Summary on [102-e-NR-RedCap-05]", 3GPP Draft; R1-2007283, 3rd Generation Partnership Project(3GPP), Mobile Competence Centre; 650, Route Des Lucioles; F-06921 Sophia-Antipolis Cedex; France, vol. RAN WG1, No. e-Meeting; Aug. 17, 2020-Aug. 28, 2020 Aug. 28, 2020 (Aug. 28, 2020), XP051922828.

Vivo et al: "Framework and Principles for Reduced Capability NR devices", 3GPP Draft; R1-2005386, 3rd Generation Partnership Project(3GPP), Mobile Competence Centre; 650, Route Des Lucioles; F-06921 Sophia-Antipolis Cedex; France, vol. RAN WG1, No. e-Meeting; Aug. 17, 2020-Aug. 28, 2020 Aug. 8, 2020 (Aug. 8, 2020), XP051917411.

European Search Report in European application No. 20957266.8, mailed on May 3, 2024.

* cited by examiner (a) Separate on frequency domain but interlaced on time domain (b) interlaced both on frequency domain and time domain (c) Separate on frequency domain and on time domain (d) interlaced on frequency domain but separate on time domain

| | | | |
|---|---|---|---|
| R | Timing Advance Command | | Oct 1 |
| Timing Advance Command | | UL Grant | Oct 2 |
| UL Grant | | | Oct 3 |
| UL Grant | | | Oct 4 |
| UL Grant | | | Oct 5 |
| Temporary C-RNTI | | | Oct 6 |
| Temporary C-RNTI | | | Oct 7 |

USER EQUIPMENT, BASE STATION, AND METHOD FOR IDENTIFYING USER EQUIPMENT

CROSS REFERENCE TO RELATED APPLICATIONS

This application is a US national phase application based upon an International Application No. PCT/CN2020/121665, filed on Oct. 16, 2020, and entitled "USER EQUIPMENT, BASE STATION, AND METHOD FOR IDENTIFYING USER EQUIPMENT". The entire disclosures of the above application are incorporated herein by reference.

BACKGROUND OF DISCLOSURE

1. Field of the Disclosure

The present disclosure relates to the field of communication systems, and more particularly, to a user equipment (UE), a base station, and methods of identifying the UE, which can provide a good communication performance and/or high reliability.

2. Description of the Related Art

Wireless communication systems are widely deployed to provide various types of communication content such as voice, video, packet data, messaging, broadcast, and so on. These wireless communication systems may be capable of supporting communication with multiple users by sharing available system resources (e.g., time, frequency, and power). Examples of such multiple-access systems include fourth generation (4G) systems such as long term evolution (LTE) systems and fifth generation (5G) systems which may be referred to as new radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipments (UEs).

A wireless communication network may include a base station that can support communication for a UE. The UE may communicate with the base station via downlink and uplink. The downlink refers to a communication link from the base station to the UE, and the uplink refers to a communication link from the UE to the base station.

In 3rd generation partnership project (3GPP) Release 17, a study item "study on support of reduced capability NR devices" has been started to develop. The scope of this study item includes identification and study of potential UE complexity reduction techniques, UE power saving, and battery lifetime enhancements for reduced capability UEs. Functionality that will enable performance degradation of such complexity reduction to be mitigated or limited, principles for how to define and constrain such reduced capabilities, and functionality that will allow devices with reduced capabilities to be explicitly identifiable to networks and networks operators and allow operators to restrict their access if desired. Support of reduced capability NR devices is an open issue.

Therefore, there is a need for a user equipment (UE), a base station, and methods of identifying the UE, which can solve issues in the prior art, reach early identification of the UE, realize coverage compensation, provide different schedules for different UE types, provide a good communication performance, and/or provide high reliability.

SUMMARY

An object of the present disclosure is to propose a user equipment (UE), a base station, and methods of identifying the UE, which can solve issues in the prior art, reach early identification of the UE, realize coverage compensation, provide different schedules for different UE types, provide a good communication performance, and/or provide high reliability.

In a first aspect of the present disclosure, a method of identifying a user equipment (UE) performed by the UE comprises processing, by the UE, a configuration associated with the UE, a UE-specific early identification, or a UE capability information, wherein processing the configuration associated with the UE comprises determining, by the UE, the configuration associated with the UE from a base station; or processing the UE-specific early identification or the UE capability information comprises transmitting or not transmitting, by the UE to the base station, the UE-specific early identification or the UE capability information; and when the configuration associated with the UE is processed by the UE, the method further comprises performing, by the UE, a random access (RA) procedure using the configuration associated with the UE, wherein a UE type of the UE is identified in the RA procedure by the base station; or when the UE-specific early identification or the UE capability information is processed by the UE, the method further comprises processing a report of the UE type of the UE, wherein the report of the UE type of the UE is triggered by the base station or triggered by the UE.

In an embodiment of the present disclosure, the UE type of the UE is a reduced capability (Redcap) UE or a regular UE.

In an embodiment of the present disclosure, when processing the UE-specific early identification or the UE capability information comprises not transmitting, by the UE to the base station, the UE-specific early identification or the UE capability information, the base station assumes the UE as the regular UE.

In an embodiment of the present disclosure, the configuration associated with the UE comprises at least one of followings: a configuration of first physical random access channel (PRACH) resources, a configuration of a first initial uplink (UL) bandwidth part (BWP), a configuration of a first random access (RA) preamble, or a configuration of first physical uplink shared channel (PUSCH) resources.

In an embodiment of the present disclosure, the RA procedure comprises at least one of the followings: a 4-step RA type, or a 2-step RA type.

In an embodiment of the present disclosure, the 4-step RA type comprises the UE transmitting a message 1 (MSG1) on the first PRACH resources in the dedicated UL BWP or the first initial UL BWP, and the MSG1 comprises the first RA preamble.

In an embodiment of the present disclosure, the 2-step RA type comprises the UE transmitting a message A (MSGA) on the first PRACH resources in the first initial UL BWP and the first PUSCH resources, and the MSG A comprises the first RA preamble and a payload.

In an embodiment of the present disclosure, the first RA preamble is transmitted on the first PRACH resources in the first initial UL BWP, and the payload is transmitted on the first PUSCH resources.

In an embodiment of the present disclosure, the first PUSCH resources are associated with the first PRACH resources.

In an embodiment of the present disclosure, the RA procedure comprises a contention-based random access procedure (CBRA) and/or a contention-free random access procedure (CFRA).

In an embodiment of the present disclosure, the configuration associated with the UE is provided to the UE on a system information or a radio resource control (RRC) signaling, the system information or the RRC signaling comprises a new information element (IE) or a field of an existing IE, the system information comprises a master information block (MIB) or a system information block (SIB), and the new IE or the field of the existing IE comprises RACH-ConfigCommon and/or RACH-ConfigCommonTwoStepRA and/or MSGA-ConfigCommon and/or numberOfRA-PreamblesGroupA and/or totalNumberOfRA-Preambles and/or MsgA-ConfigCommon IE and/or MsgA-PUSCH-Config IE.

In an embodiment of the present disclosure, the configuration of the first RA preamble comprises CBRA preambles and CFRA preambles, and the CBRA preambles comprises a group A and a group B.

In an embodiment of the present disclosure, the CBRA preambles and the CFRA preambles of the Redcap UE are interlaced with or separated from CBRA preambles and CFRA preambles of the regular UE.

In an embodiment of the present disclosure, when multiple Redcap UE types are defined, RA preambles of each Redcap UE type are interlaced with or separated from each other.

In an embodiment of the present disclosure, M fields are introduced to partition the group A of the CBRA preambles, the group B of the CBRA preambles, and the CFRA preambles into sections of the Redcap UE and the regular UE, respectively, and a number of M is related to a number of Redcap UE types or one Redcap UE type.

In an embodiment of the present disclosure, M is 3 if there is a single Redcap UE type, and/or M is 6 if there are two Redcap UE types.

In an embodiment of the present disclosure, fields are introduced to indicate a number of corresponding preambles of the regular UE if there is a single Redcap UE type.

In an embodiment of the present disclosure, the fields are introduced to indicate a number of CBRA preambles of the regular UE per synchronous signal block (SSB) in the group A, if there is no field, all CBRA preambles in the group A are available for the regular UE or the Redcap UE.

In an embodiment of the present disclosure, the fields are introduced to indicate a number of CBRA preambles of the regular UE per SSB in the group B, if there is no field, all CBRA preambles in the group B are available for the regular UE or the Redcap UE.

In an embodiment of the present disclosure, the fields are introduced to indicate a number of CFRA preambles of the regular UE, if there is no field, all CFRA preambles are available for the regular UE or the Redcap UE.

In an embodiment of the present disclosure, fields are introduced to indicate a number of corresponding preambles of the Redcap UE if there are two Redcap UE types.

In an embodiment of the present disclosure, the fields are introduced to indicate a number of CBRA preambles of the first Redcap UE type per SSB in the group A and/or a number of CBRA preambles of the second Redcap UE type per SSB in the group A, and/or the fields are introduced to indicate a number of CBRA preambles of the first Redcap UE type per SSB in the group B and/or a number of CBRA preambles of the second Redcap UE type per SSB in the group B, and/or the fields are introduced to indicate a number of CFRA preambles of the first Redcap UE type and/or a number of CFRA preambles of the second Redcap UE type.

In an embodiment of the present disclosure, the configuration of PRACH resources comprises a number of PRACH occasions (POs), an offset of the lowest PO in frequency domain with respective to PRB 0, and/or a PRACH configuration index.

In an embodiment of the present disclosure, for frequency domain multiplexed (FDMed) POs, POs of the Redcap UE and POs of the regular UE are interlaced with or separated from each other, and if multiple Redcap UE types are defined, POs of each Redcap UE type are interlaced with or separated from each other.

In an embodiment of the present disclosure, for time domain multiplexed (TDMed) POs, POs of the Redcap UE and POs of the regular UE are interlaced with or separated from each other, and if multiple Redcap UE types are defined, POs of each Redcap UE type are interlaced with or separated from each other.

In an embodiment of the present disclosure, POs of the Redcap UE and POs of the regular UE are separated from each other on frequency domain but interlaced with each other on time domain; or the POs of the Redcap UE and the POs of the regular UE are interlaced with each other both on frequency domain and time domain; or the POs of the Redcap UE and the POs of the regular UE are separated from each other both on frequency domain and time domain; or the POs of the Redcap UE and the POs of the regular UE are separated from each other on time domain but interlaced with each other on frequency domain.

In an embodiment of the present disclosure, for the configuration of the first PRACH resources, if the base station supports deployment of Redcap UEs, the base station provides RedcapUE-related PRACH resources configurations on a system information or an RRC; the UE decodes the SI or the RRC and acquires contents comprises PRACH resources configurations for Redcap UEs; the UE selects a suitable PO to transmit a preamble based on an respective UE type; according to a frequency domain location and/or a time domain location of the selected PO, the base station identities the UE type; and the base station schedules an RAR and subsequent messages within transmission capability of the respective UE type.

In an embodiment of the present disclosure, for the configuration of the first initial UL BWP, if the base station supports deployment of Redcap UEs, the base station provide RedcapUE-related initial UL BWP configurations on a system information or an RRC, the UE decodes the SI or the RRC and acquires contents comprising initial UL BWP configurations for Redcap UEs, the UE selects an initial UL BWP corresponding to the respective UE type to transmit the preamble; according to frequency domain and a bandwidth of a respective bandwidth part, the base station identities the UE type, and the base station schedules subsequent messages within transmission capability of the respective UE type.

In an embodiment of the present disclosure, for the configuration of the first PUSCH resources, if the base station supports deployment of Redcap UEs and a 2-step RA, the base station provides RedcapUE-related MSGA PUSCH configurations on a system information or an RRC, the UE decodes the SI or the RRC and acquires contents comprises MSGA PUSCH configurations for Redcap UEs, the UE selects a MSGA PUSCH corresponding to the respective UE type to transmit a MSGA payload; according to frequency domain and a bandwidth of MSGA PUSCH, the base station identities the UE type, and the base station schedules subsequent messages within transmission capability of the respective UE type.

In an embodiment of the present disclosure, the method further comprises determining, by the UE from the base station, a random access response (RAR) within a transmission capability of the identified UE type.

In an embodiment of the present disclosure, the method further comprises transmitting, by the UE to the base station, a post-RAR message or a post message 2 (post-Msg2) comprising the UE-specific early identification or the UE capability information, wherein the UE type of the UE is refreshed by the base station according to the UE-specific early identification or the UE capability information when the UE reports to the base station the UE-specific early identification or the UE capability information and the MSG1 uses specific resources; and determining, by the UE from the base station, a subsequent message within a transmission capability of the refreshed UE type.

In an embodiment of the present disclosure, the report of the UE-specific early identification is triggered by the base station or the UE; if the report of the UE-specific early identification is triggered by the base station, the UE gets an early identification command on a downlink (DL) message; if the report of the UE-specific early identification is triggered by the UE, the UE does not need to get the early identification command on the DL message.

In an embodiment of the present disclosure, the DL message comprises a MSG2, a MSGB, a MSG4, a UE capability enquiry, or a security mode command, and the early identification command is used to indicate the UE-specific early identification on a MSG3 or a post MSG4.

In an embodiment of the present disclosure, the early identification command comprises the respective UE type in which all UEs or only Redcap UEs report the respective UE type and/or fields related to the respective UE type and/or fields independent but piggyback the respective UE type, and the fields of the early identification command are used to inform the all UEs or the Redcap UE to report the respective type to the base station in a subsequent message.

In an embodiment of the present disclosure, the UE-specific early identification is transmitted on a MSGA, or a MSG3, or a post MSG4, or a MSG5, or a UE capability information, or a security mode complete, or a UL information transfer, or a UE information response, or a measurement report.

In an embodiment of the present disclosure, a medium access control (MAC) packet data unit (PDU) of the MSG2 and/or the MSGB consists of one or more MAC subPDUs; each MSG2 MAC subPDU consists of one of the followings: a MAC subheader with backoff indicator only; a MAC subheader with random access preamble identifier (RAPID) only; or a MAC subheader with RAPID and MAC RAR.

In an embodiment of the present disclosure, each MSGB MAC subPDU consists of one of the followings: a MAC subheader with backoff indicator only; a MAC subheader and fallbackRAR; a MAC subheader and successRAR; a MAC subheader and MAC service data unit (SDU) for common control channel (CCCH) or dedicated control channel (DCCH); or a MAC subheader and padding; each MSGB MAC subPDU consists of one of the followings: a MAC subheader with backoff indicator only; a MAC subheader and fallbackRAR; a MAC subheader and successRAR; a MAC subheader and MAC service data unit (SDU) for common control channel (CCCH) or dedicated control channel (DCCH); or a MAC subheader and padding.

In an embodiment of the present disclosure, the early identification command is included in the MAC RAR or the MAC SDU and/or the early identification command is carried in the fallbackRAR or the successRAR, and/or a MAC subheader with a logical channel identifier (LCID) only comprises the early identification command used to indicate the UE to report the UE-specific early identification.

In an embodiment of the present disclosure, the UE-specific early identification is reported by the UE by a MAC control element (CE), the MAC CE corresponds to a MAC subheader which consisting of header fields R/F/LCID/L, and a UE-specific early identification format is identified by the MAC subheader with the LCID.

In a second aspect of the present disclosure, a method of identifying a user equipment (UE) performed by a base station comprises processing, by the base station, a configuration associated with the UE, a UE-specific early identification, or a UE capability information, wherein processing the configuration associated with the UE comprises configuring, by the base station, the configuration associated with the UE to the UE; or processing the UE-specific early identification or the UE capability information comprises receiving or not receiving, by the base station from the UE, the UE-specific early identification or the UE capability information; and when the configuration associated with the UE is processed by the base station, the method further comprises performing, by the base station, a random access (RA) procedure using the configuration associated with the UE, wherein a UE type of the UE is identified in the RA procedure by the base station; or when the UE-specific early identification or the UE capability information is processed by the base station, the method further comprises processing a report of the UE type of the UE, wherein the report of the UE type of the UE is triggered by the base station or triggered by the UE.

In an embodiment of the present disclosure, the UE type of the UE is a reduced capability (Redcap) UE or a regular UE.

In an embodiment of the present disclosure, when processing the UE-specific early identification or the UE capability information comprises not receiving, by the base station from the UE, the UE-specific early identification or the UE capability information, the base station assumes the UE as the regular UE.

In an embodiment of the present disclosure, the configuration associated with the UE comprises at least one of followings: a configuration of first physical random access channel (PRACH) resources, a configuration of a first initial uplink (UL) bandwidth part (BWP), a configuration of a first random access (RA) preamble, or a configuration of first physical uplink shared channel (PUSCH) resources.

In an embodiment of the present disclosure, the RA procedure comprises at least one of the followings: a 4-step RA type, or a 2-step RA type.

In an embodiment of the present disclosure, the 4-step RA type comprises the base station receiving a message 1 (MSG1) on the first PRACH resources in the dedicated UL BWP or the first initial UL BWP, and the MSG1 comprises the first RA preamble.

In an embodiment of the present disclosure, the 2-step RA type comprises the base station transmitting a message A (MSGA) on the first PRACH resources in the first initial UL BWP and the first PUSCH resources, and the MSG A comprises the first RA preamble and a payload.

In an embodiment of the present disclosure, the first RA preamble is transmitted on the first PRACH resources in the first initial UL BWP, and the payload is transmitted on the first PUSCH resources.

In an embodiment of the present disclosure, the first PUSCH resources are associated with the first PRACH resources.

In an embodiment of the present disclosure, the RA procedure comprises a contention-based random access procedure (CBRA) and/or a contention-free random access procedure (CFRA).

In an embodiment of the present disclosure, the configuration associated with the UE is provided to the UE on a system information or a radio resource control (RRC) signaling, the system information or the RRC signaling comprises a new information element (IE) or a field of an existing IE, the system information comprises a master information block (MIB) or a system information block (SIB), and the new IE or the field of the existing IE comprises RACH-ConfigCommon and/or RACH-ConfigCommonTwoStepRA and/or MSGA-ConfigCommon and/or numberOfRA-PreamblesGroupA and/or totalNumberOfRA-Preambles and/or MsgA-ConfigCommon IE and/or MsgA-PUSCH-Config IE.

In an embodiment of the present disclosure, the configuration of the first RA preamble comprises CBRA preambles and CFRA preambles, and the CBRA preambles comprises a group A and a group B.

In an embodiment of the present disclosure, the CBRA preambles and the CFRA preambles of the Redcap UE are interlaced with or separated from CBRA preambles and CFRA preambles of the regular UE.

In an embodiment of the present disclosure, when multiple Redcap UE types are defined, RA preambles of each Redcap UE type are interlaced with or separated from each other.

In an embodiment of the present disclosure, M fields are introduced to partition the group A of the CBRA preambles, the group B of the CBRA preambles, and the CFRA preambles into sections of the Redcap UE and the regular UE, respectively, and a number of M is related to a number of Redcap UE types or one Redcap UE type.

In an embodiment of the present disclosure, M is 3 if there is a single Redcap UE type, and/or M is 6 if there are two Redcap UE types.

In an embodiment of the present disclosure, fields are introduced to indicate a number of corresponding preambles of the regular UE if there is a single Redcap UE type.

In an embodiment of the present disclosure, the fields are introduced to indicate a number of CBRA preambles of the regular UE per synchronous signal block (SSB) in the group A, if there is no field, all CBRA preambles in the group A are available for the regular UE or the Redcap UE.

In an embodiment of the present disclosure, the fields are introduced to indicate a number of CBRA preambles of the regular UE per SSB in the group B, if there is no field, all CBRA preambles in the group B are available for the regular UE or the Redcap UE.

In an embodiment of the present disclosure, the fields are introduced to indicate a number of CFRA preambles of the regular UE, if there is no field, all CFRA preambles are available for the regular UE or the Redcap UE.

In an embodiment of the present disclosure, fields are introduced to indicate a number of corresponding preambles of the Redcap UE if there are two Redcap UE types.

In an embodiment of the present disclosure, the fields are introduced to indicate a number of CBRA preambles of the first Redcap UE type per SSB in the group A and/or a number of CBRA preambles of the second Redcap UE type per SSB in the group A, and/or the fields are introduced to indicate a number of CBRA preambles of the first Redcap UE type per SSB in the group B and/or a number of CBRA preambles of the second Redcap UE type per SSB in the group B, and/or the fields are introduced to indicate a number of CFRA preambles of the first Redcap UE type and/or a number of CFRA preambles of the second Redcap UE type.

In an embodiment of the present disclosure, the configuration of PRACH resources comprises a number of PRACH occasions (POs), an offset of the lowest PO in frequency domain with respective to PRB 0, and/or a PRACH configuration index.

In an embodiment of the present disclosure, for frequency domain multiplexed (FDMed) POs, POs of the Redcap UE and POs of the regular UE are interlaced with or separated from each other, and if multiple Redcap UE types are defined, POs of each Redcap UE type are interlaced with or separated from each other.

In an embodiment of the present disclosure, for time domain multiplexed (TDMed) POs, POs of the Redcap UE and POs of the regular UE are interlaced with or separated from each other, and if multiple Redcap UE types are defined, POs of each Redcap UE type are interlaced with or separated from each other.

In an embodiment of the present disclosure, POs of the Redcap UE and POs of the regular UE are separated from each other on frequency domain but interlaced with each other on time domain; or the POs of the Redcap UE and the POs of the regular UE are interlaced with each other both on frequency domain and time domain; or the POs of the Redcap UE and the POs of the regular UE are separated from each other both on frequency domain and time domain; or the POs of the Redcap UE and the POs of the regular UE are separated from each other on time domain but interlaced with each other on frequency domain.

In an embodiment of the present disclosure, for the configuration of the first PRACH resources, if the base station supports deployment of Redcap UEs, the base station provides RedcapUE-related PRACH resources configurations on a system information or an RRC; the UE decodes the SI or the RRC and acquires contents comprises PRACH resources configurations for Redcap UEs; the UE selects a suitable PO to transmit a preamble based on an respective UE type; according to a frequency domain location and/or a time domain location of the selected PO, the base station identities the UE type; and the base station schedules an RAR and subsequent messages within transmission capability of the respective UE type.

In an embodiment of the present disclosure, for the configuration of the first initial UL BWP, if the base station supports deployment of Redcap UEs, the base station provide RedcapUE-related initial UL BWP configurations on a system information or an RRC, the UE decodes the SI or the RRC and acquires contents comprising initial UL BWP configurations for Redcap UEs, the UE selects an initial UL BWP corresponding to the respective UE type to transmit the preamble; according to frequency domain and a bandwidth of a respective bandwidth part, the base station identities the UE type, and the base station schedules subsequent messages within transmission capability of the respective UE type.

In an embodiment of the present disclosure, for the configuration of the first PUSCH resources, if the base station supports deployment of Redcap UEs and a 2-step RA, the base station provides RedcapUE-related MSGA PUSCH configurations on a system information or an RRC, the UE decodes the SI or the RRC and acquires contents comprises MSGA PUSCH configurations for Redcap UEs, the UE selects a MSGA PUSCH corresponding to the respective UE type to transmit a MSGA payload; according to frequency domain and a bandwidth of MSGA PUSCH, the base station identities the UE type, and the base station schedules subsequent messages within transmission capability of the respective UE type.

In an embodiment of the present disclosure, the method further comprises determining, by the UE from the base station, a random access response (RAR) within a transmission capability of the identified UE type.

In an embodiment of the present disclosure, the method further comprises transmitting, by the UE to the base station, a post-RAR message or a post message 2 (post-Msg2) comprising the UE-specific early identification or the UE capability information, wherein the UE type of the UE is refreshed by the base station according to the UE-specific early identification or the UE capability information when the UE reports to the base station the UE-specific early identification or the UE capability information and the MSG1 uses specific resources; and determining, by the UE from the base station, a subsequent message within a transmission capability of the refreshed UE type.

In an embodiment of the present disclosure, the report of the UE-specific early identification is triggered by the base station or the UE; if the report of the UE-specific early identification is triggered by the base station, the UE gets an early identification command on a downlink (DL) message; if the report of the UE-specific early identification is triggered by the UE, the UE does not need to get the early identification command on the DL message.

In an embodiment of the present disclosure, the DL message comprises a MSG2, a MSGB, a MSG4, a UE capability enquiry, or a security mode command, and the early identification command is used to indicate the UE-specific early identification on a MSG3 or a post MSG4.

In an embodiment of the present disclosure, the early identification command comprises the respective UE type in which all UEs or only Redcap UEs report the respective UE type and/or fields related to the respective UE type and/or fields independent but piggyback the respective UE type, and the fields of the early identification command are used to inform the all UEs or the Redcap UE to report the respective type to the base station in a subsequent message.

In an embodiment of the present disclosure, the UE-specific early identification is transmitted on a MSGA, or a MSG3, or a post MSG4, or a MSG5, or a UE capability information, or a security mode complete, or a UL information transfer, or a UE information response, or a measurement report.

In an embodiment of the present disclosure, a medium access control (MAC) packet data unit (PDU) of the MSG2 and/or the MSGB consists of one or more MAC subPDUs; each MSG2 MAC subPDU consists of one of the followings: a MAC subheader with backoff indicator only; a MAC subheader with random access preamble identifier (RAPID) only; or a MAC subheader with RAPID and MAC RAR.

In an embodiment of the present disclosure, each MSGB MAC subPDU consists of one of the followings: a MAC subheader with backoff indicator only; a MAC subheader and fallbackRAR; a MAC subheader and successRAR; a MAC subheader and MAC service data unit (SDU) for common control channel (CCCH) or dedicated control channel (DCCH); or a MAC subheader and padding; each MSGB MAC subPDU consists of one of the followings: a MAC subheader with backoff indicator only; a MAC subheader and fallbackRAR; a MAC subheader and successRAR; a MAC subheader and MAC service data unit (SDU) for common control channel (CCCH) or dedicated control channel (DCCH); or a MAC subheader and padding.

In an embodiment of the present disclosure, the early identification command is included in the MAC RAR or the MAC SDU and/or the early identification command is carried in the fallbackRAR or the successRAR, and/or a MAC subheader with a logical channel identifier (LCID) only comprises the early identification command used to indicate the UE to report the UE-specific early identification.

In an embodiment of the present disclosure, the UE-specific early identification is reported by the UE by a MAC control element (CE), the MAC CE corresponds to a MAC subheader which consisting of header fields R/F/LCID/L, and a UE-specific early identification format is identified by the MAC subheader with the LCID.

In a third aspect of the present disclosure, a user equipment (UE) comprises a memory, a transceiver, and a processor coupled to the memory and the transceiver. The processor is configured to execute the above method.

In a third aspect of the present disclosure, a base station comprises a memory, a transceiver, and a processor coupled to the memory and the transceiver. The processor is configured to execute the above method.

In a fifth aspect of the present disclosure, a non-transitory machine-readable storage medium has stored thereon instructions that, when executed by a computer, cause the computer to perform the above method.

In a sixth aspect of the present disclosure, a chip includes a processor, configured to call and run a computer program stored in a memory, to cause a device in which the chip is installed to execute the above method.

In a seventh aspect of the present disclosure, a computer readable storage medium, in which a computer program is stored, causes a computer to execute the above method.

In an eighth aspect of the present disclosure, a computer program product includes a computer program, and the computer program causes a computer to execute the above method.

In a ninth aspect of the present disclosure, a computer program causes a computer to execute the above method.

BRIEF DESCRIPTION OF DRAWINGS

In order to more clearly illustrate the embodiments of the present disclosure or related art, the following figures will be described in the embodiments are briefly introduced. It is obvious that the drawings are merely some embodiments of the present disclosure, a person having ordinary skill in this field can obtain other figures according to these figures without paying the premise.

DETAILED DESCRIPTION OF EMBODIMENTS

Figure 1:
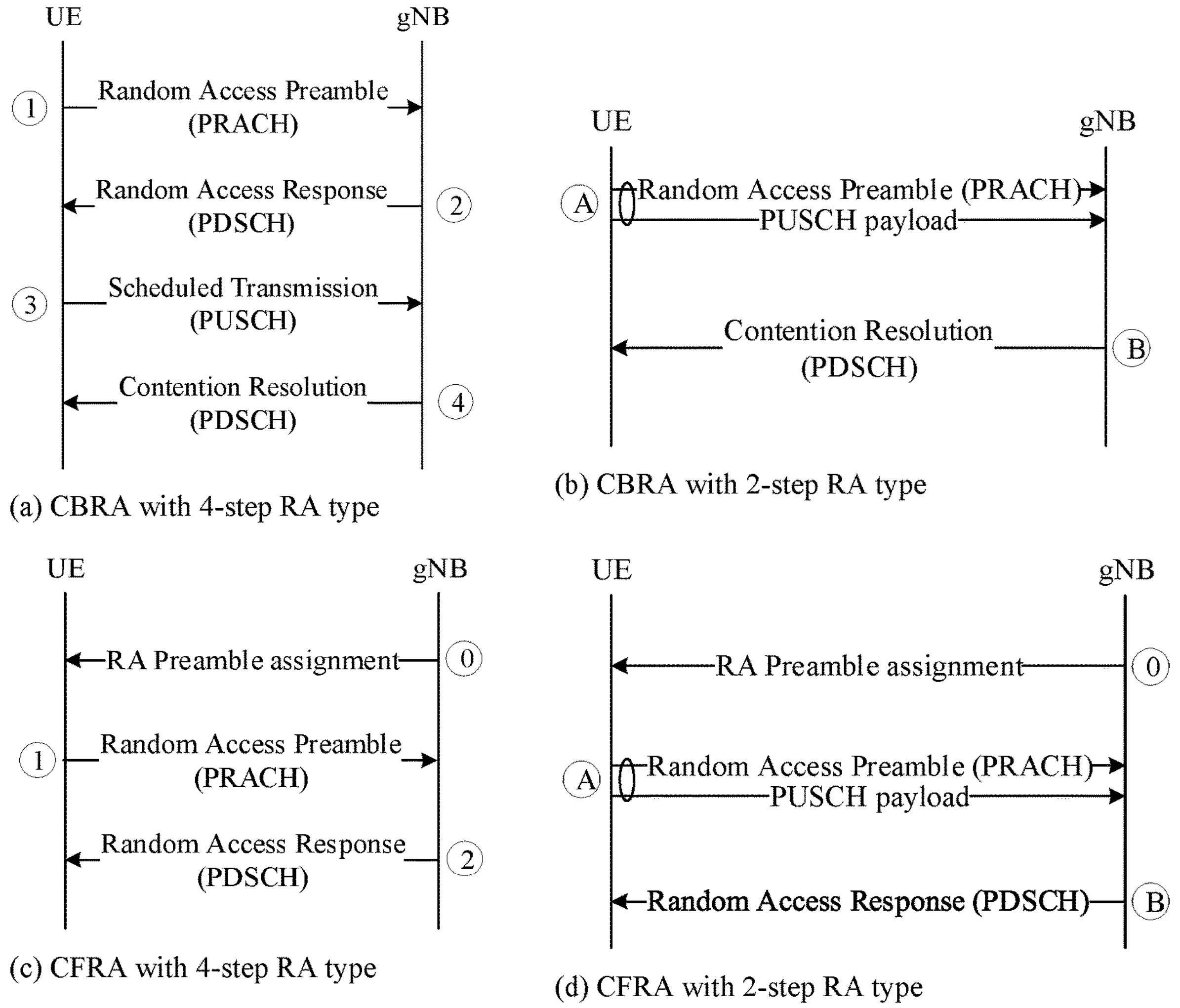
FIG. 1 is a schematic diagram illustrating random access (RA) procedures according to an embodiment of the present disclosure.

Embodiments of the present disclosure are described in detail with the technical matters, structural features, achieved objects, and effects with reference to the accompanying drawings as follows. Specifically, the terminologies in the embodiments of the present disclosure are merely for describing the purpose of the certain embodiment, but not to limit the disclosure.

Some embodiments of the present disclosure are related to a new radio (NR) wireless communication system and a reduced capability (Redcap) user equipment (UE). Some embodiments of the present disclosure provide methods of identifying a Redcap UE during random access. Some embodiments of the present disclosure provide several methods of identifying a Redcap UE earlier.

In some embodiments, reduced capability UEs (Redcap UEs) include at least one of the followings: Industrial wireless sensor: pressure sensors, humidity sensors, thermometers, motion sensors, accelerometers, actuators, and etc. Surveillance cameras in smart city use case: which covers data collection and processing to more efficiently monitor and control city resources, and to provide services to city residents. Wearable devices: smart watches, rings, eHealth related devices, and medical monitoring devices etc.

One important objective of 5G is to enable connected industries. 5G connectivity can serve as catalyst for next wave of industrial transformation and digitalization. It is desirable to connect these industrial wireless sensors and actuators to 5G networks and core. The massive industrial wireless sensor network (IWSN) use cases and requirements described in TR 22.804, TS 22.104, TR 22.832 and TS 22.261 include not only ultra-reliable low latency communication (URLLC) services with very high requirements, but also relatively low-end services with the requirement of small device form factors, and/or being completely wireless with a battery life of several years. The requirements for these services that are higher than low power wide area (LPWA) (i.e. long term evolution machine-type communications (LTE-M)/narrowband internet of things (NB-IOT)) but lower than URLCC and enhanced mobile broadband (eMBB).

Similar to connected industries, 5G connectivity can serve as catalyst for the next wave smart city innovations. As an example, TS 22.804 describes smart city use case and requirements for that. The smart city vertical covers data collection and processing to more efficiently monitor and control city resources, and to provide services to city residents. Especially, the deployment of surveillance cameras is an essential part of the smart city but also of factories and industries. Further, wearables use case includes smart watches, rings, eHealth related devices, and medical monitoring devices etc. One characteristic for the use case is that the device is small in size. Therefore, as a baseline, requirements for these UEs require at least one of the followings: With complexity reduction features. Device complexity:

Main motivation for a new device type is to lower device cost and complexity as compared to high-end eMBB and URLLC devices. Deployment scenarios: System should support all frequency bands FR1/FR2 for frequency division duplexing (FDD) and time division duplexing (TDD). Device size: The device design should be with compact form factor. With lower power consumption and longer battery lifetime.

The following is one of objectives of study items in some embodiments of the present disclosure: Study functionality that will allow devices with reduced capabilities to be explicitly identifiable to networks and network operators, and allow operators to restrict their access, if desired [RAN2, RAN1]. As can be seen from the above, it is imperative that Redcap UEs can be identified by a network without ambiguity. Here, it is noted that such identification is relevant primarily in the context of accessing a cell. How early such identification needs to be made depends on a random access procedure for Redcap UEs and whether there may be differences for Redcap UEs compared to regular NR UEs. In case different handling of Redcap UEs is required for random access, then early identification may be necessary. Some motivations include at least one of the followings: As analyzed in many contributions of 3GPP, capabilities reduction may cause performance degradation in downlink (DL) channels. In order to compensate the coverage loss, it is better to have early indication of Redcap UE in a RACH procedure. The reduction of UE bandwidth (e.g., for 50 MHz in FR2) may cause the co-existing problems with the normal NR UEs. For example, if the size of CORESET 0 configured for normal NR UEs is larger than 50 MHz, the reduced capability UE only can receive RAR and a message 4 (MSG4) that are scheduled within the UE bandwidth of the reduced capability UE. In this case, a base station such as a gNB should identify the reduced capability UE type before RAR/Msg4 transmission.

Figure 2:
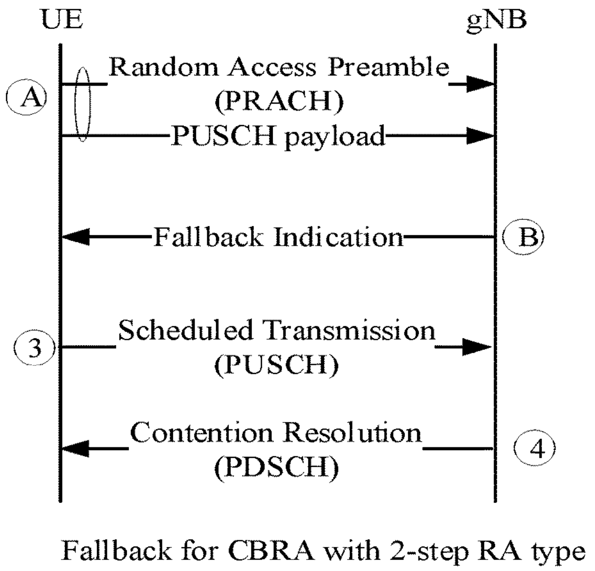
FIG. 2 is a schematic diagram illustrating fallback for contention-based random access (CBRA) with 2-step RA type according to an embodiment of the present disclosure.

FIG. 1 illustrates random access (RA) procedures according to an embodiment of the present disclosure. FIG. 2 illustrates fallback for contention-based random access (CBRA) with 2-step RA type according to an embodiment of the present disclosure. In NR, two types of random access procedures are supported: 4-step RA with a message 1 (MSG1) and 2-step RA type with a message A (MSGA). Both types of RA procedures support contention-based random access (CBRA) and contention-free random access (CFRA) as illustrated in FIG. 1. The MSGA of the 2-step RA type includes a preamble on a physical random access channel (PRACH) and a payload on a physical uplink shared channel (PUSCH). After MSGA transmission, a UE monitors for a response from a network such as a base station within a configured window. For CBRA, if contention resolution is successful upon receiving the network response, the UE ends the random access procedure as illustrated in FIG. 1(*b*); while if fallback indication is received in MSGB, the UE performs MSG3 transmission and monitors contention resolution as illustrated in FIG. 2. If contention resolution is not successful after MSG3 (re) transmission(s), the UE goes back to MSGA transmission.

Further, the UE selects the type of random access at initiation of the random access procedure based on network configuration: When CFRA resources are not configured, an RSRP threshold is used by the UE to select between 2-step RA type and 4-step RA type; when CFRA resources for 4-step RA type are configured, UE performs random access with 4-step RA type; and/or or when CFRA resources for 2-step RA type are configured, UE performs random access with 2-step RA type. The network does not configure CFRA resources for 4-step and 2-step RA types at the same time for a Bandwidth Part (BWP). CFRA with 2-step RA type is only supported for handover.

The MSG1 of the 4-step RA type consists of a preamble on PRACH. After MSG1 transmission, the UE monitors for a response from the network within a configured window. For CFRA, dedicated preamble for MSG1 transmission is assigned by the network and upon receiving random access response from the network, the UE ends the random access procedure as illustrated in FIG. 1(*c*). For CBRA, upon reception of the random access response, the UE sends MSG3 using the UL grant scheduled in the response and monitors contention resolution as illustrated in FIG. 1(*a*). If contention resolution is not successful after MSG3 (re) transmission(s), the UE goes back to MSG1 transmission.

The MSGA of the 2-step RA type includes a preamble on PRACH and a payload on PUSCH. After MSGA transmission, the UE monitors for a response from the network within a configured window. For CFRA, dedicated preamble and PUSCH resource are configured for MSGA transmission and upon receiving the network response, the UE ends the random access procedure as illustrated in FIG. 1(*d*). For CBRA, if contention resolution is successful upon receiving the network response, the UE ends the random access procedure illustrated in FIG. 1(*b*); while if fallback indication is received in MSGB, the UE performs MSG3 transmission using the UL grant scheduled in the fallback indication and monitors contention resolution as illustrated in FIG. 1. If contention resolution is not successful after MSG3 (re)transmission(s), the UE goes back to MSGA transmission. If the random access procedure with 2-step RA type is not completed after a number of MSGA transmissions, the UE can be configured to switch to CBRA with 4-step RA type.

Further, the following is one of objectives of study items in some embodiments of the present disclosure:

Further study options for identification of Redcap UEs, including one of the following indication methods: Option 1: During Msg1 transmission, e.g., via separate initial UL BWP, separate PRACH resource, or PRACH preamble partitioning. Option 2: During Msg3 transmission. Option 3: Post Msg4 acknowledgment, e.g., during Msg5 transmission or part of UE capability reporting. Option 4: During MSGA transmission (subject to support of if 2-step RACH). Other options are not precluded. Note: This study intends to establish feasibility of, and pros and cons for the identified options from RAN1 perspective, without any intention of down-selection without guidance from RAN2. In some embodiments, the topic about UE types for Redcap UE is discussed, and some proposals include: Study at most two UE types striving for a single UE type for each FR for Redcap in Release 17. Low-band/mid-band differentiation and/or FDD/TDD differentiation is in FR1. The definition of each UE type with the followings is as the starting point. Alternative 1: Function-specific. Alternative 2: Scenario/use case-specific. Additionally, how to define UE type for Redcap is discussed in some embodiments including that existing UE feature/capability framework is the baseline to define the UE type for Redcap and/or study whether any additional mechanisms on top of existing UE feature/capability framework are necessary to define the UE type for Redcap. Beneficial effects of some embodiments of the present disclosure include determining methods of early identification of UE, which will help to realize coverage compensation and different schedule for different UE types.

Figure 3:
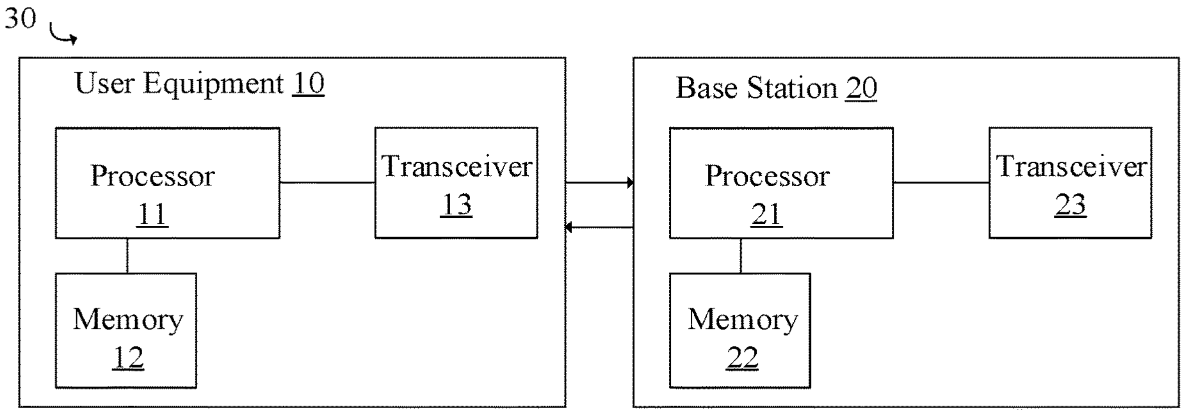
FIG. 3 is a block diagram of one or more user equipments (UEs) and a base station (e.g., gNB) of communication in a communication network system according to an embodiment of the present disclosure.

FIG. 3 illustrates that, in some embodiments, one or more user equipments (UEs) 10 and a base station (e.g., gNB) 20 for communication in a communication network system 30 according to an embodiment of the present disclosure are provided. The communication network system 30 includes the one or more UEs 10 and the base station 20. The one or more UEs 10 may include a memory 12, a transceiver 13, and a processor 11 coupled to the memory 12, the transceiver 13. The base station 20 may include a memory 22, a transceiver 23, and a processor 21 coupled to the memory 22, the transceiver 23. The processor 11 or 21 may be configured to implement proposed functions, procedures and/or methods described in this description. Layers of radio interface protocol may be implemented in the processor 11 or 21. The memory 12 or 22 is operatively coupled with the processor 11 or 21 and stores a variety of information to operate the processor 11 or 21. The transceiver 13 or 23 is operatively coupled with the processor 11 or 21, and the transceiver 13 or 23 transmits and/or receives a radio signal.

The processor 11 or 21 may include application-specific integrated circuit (ASIC), other chipset, logic circuit and/or data processing device. The memory 12 or 22 may include read-only memory (ROM), random access memory (RAM), flash memory, memory card, storage medium and/or other storage device. The transceiver 13 or 23 may include baseband circuitry to process radio frequency signals. When the embodiments are implemented in software, the techniques described herein can be implemented with modules (e.g., procedures, functions, and so on) that perform the functions described herein. The modules can be stored in the memory 12 or 22 and executed by the processor 11 or 21. The memory 12 or 22 can be implemented within the processor 11 or 21 or external to the processor 11 or 21 in which case those can be communicatively coupled to the processor 11 or 21 via various means as is known in the art.

In some embodiments, the processor 11 is configured to: process a configuration associated with the UE 10, a UE-specific early identification, or a UE capability information, wherein processing the configuration associated with the UE 10 comprises determining, by the processor 11, the configuration associated with the UE 10 from the base station 20; or processing the UE-specific early identification or the UE capability information comprises transmitting or not transmitting, by the transceiver 13 to the base station 20, the UE-specific early identification or the UE capability information; and when the configuration associated with the UE 10 is processed by the processor 11, the processor 11 performs a random access (RA) procedure using the configuration associated with the UE 10, wherein a UE type of the UE 10 is identified in the RA procedure by the base station 20; or when the UE-specific early identification or the UE capability information is processed by the processor 11, the processor 11 processes a report of the UE type of the UE 10, wherein the report of the UE type of the UE 10 is triggered by the base station 20 or triggered by the UE 10. This can solve issues in the prior art, reach early identification of the UE, realize coverage compensation, provide different schedules for different UE types, provide a good communication performance, and/or provide high reliability.

In some embodiments, the processor 21 is configured to: process a configuration associated with the UE 10, a UE-specific early identification, or a UE capability information, wherein processing the configuration associated with the UE 10 comprises configuring, by the processor 21, the configuration associated with the UE 10 to the UE 10; or processing the UE-specific early identification or the UE capability information comprises receiving or not receiving, by the transceiver 23 from the UE 10, the UE-specific early identification or the UE capability information; and when the configuration associated with the UE 10 is processed by the processor 21, the processor 21 performs a random access (RA) procedure using the configuration associated with the UE 10, wherein a UE type of the UE 10 is identified in the RA procedure by the base station 20; or when the UE-specific early identification or the UE capability information is processed by the processor 21, the processor 21 processes a report of the UE type of the UE 10, wherein the report of the UE type of the UE 10 is triggered by the base station 20 or triggered by the UE 10. This can solve issues in the prior art, reach early identification of the UE, realize coverage compensation, provide different schedules for different UE types, provide a good communication performance, and/or provide high reliability.

Figure 4:
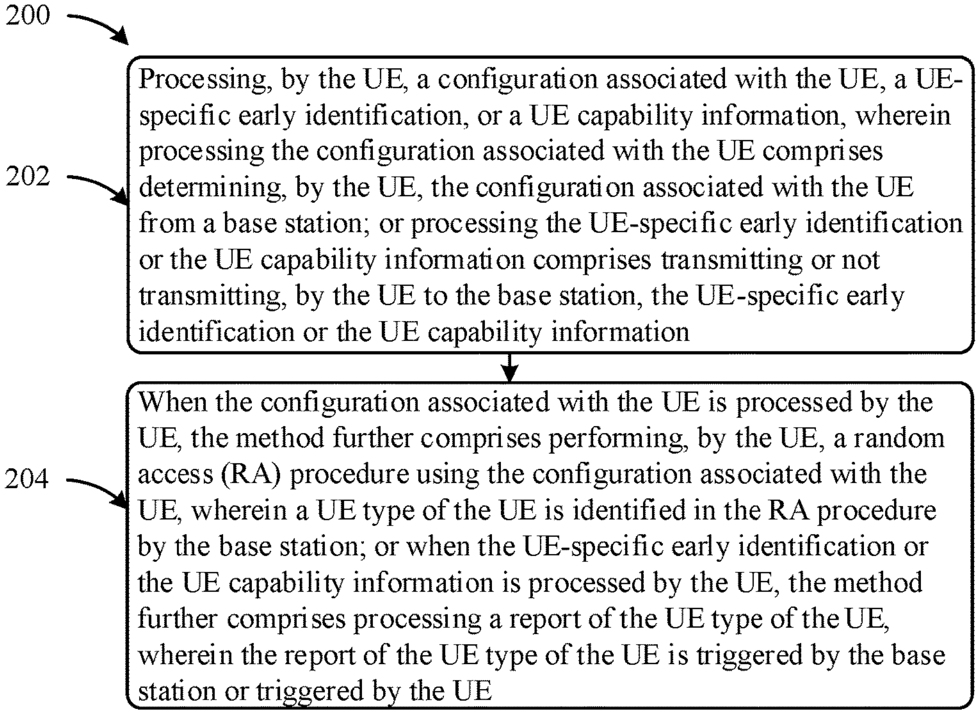
FIG. 4 is a flowchart illustrating a method of identifying a user equipment (UE) performed by the UE according to an embodiment of the present disclosure.

FIG. 4 illustrates a method 200 of identifying a user equipment (UE) performed by the UE according to an embodiment of the present disclosure. In some embodiments, the method 200 includes: a block 202, processing, by the UE, a configuration associated with the UE, a UE-specific early identification, or a UE capability information, wherein processing the configuration associated with the UE comprises determining, by the UE, the configuration associated with the UE from a base station; or processing the UE-specific early identification or the UE capability information comprises transmitting or not transmitting, by the UE to the base station, the UE-specific early identification or the UE capability information; and a block 204, when the configuration associated with the UE is processed by the UE, the method further comprises performing, by the UE, a random access (RA) procedure using the configuration associated with the UE, wherein a UE type of the UE is identified in the RA procedure by the base station; or when the UE-specific early identification or the UE capability information is processed by the UE, the method further comprises processing a report of the UE type of the UE, wherein the report of the UE type of the UE is triggered by the base station or triggered by the UE. This can solve issues in the prior art, reach early identification of the UE, realize coverage compensation, provide different schedules for different UE types, provide a good communication performance, and/or provide high reliability.

Figure 5:
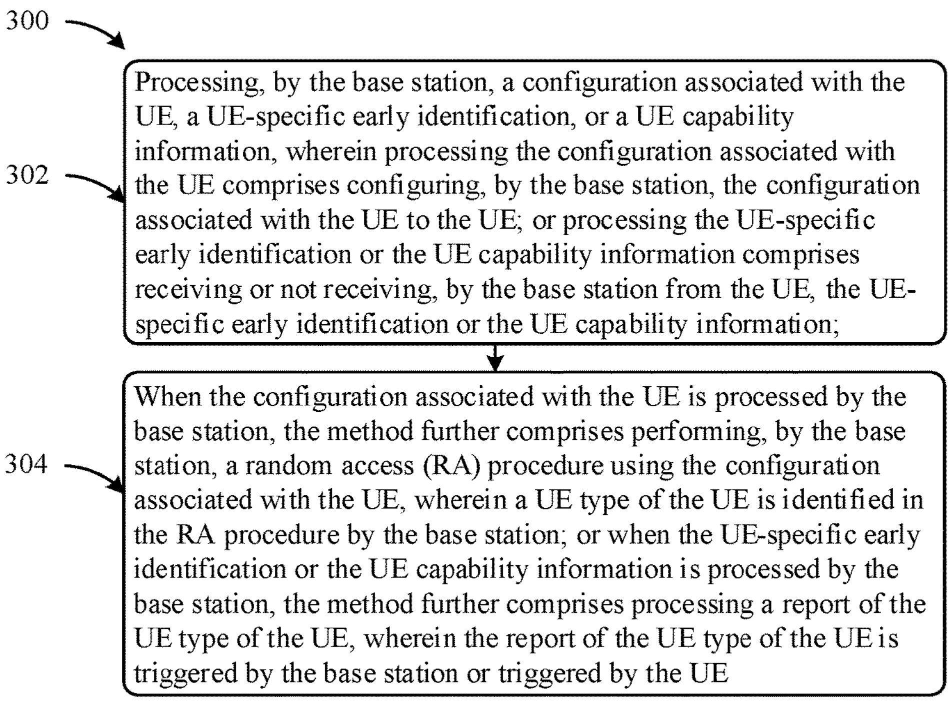
FIG. 5 is a flowchart illustrating a method of identifying a user equipment (UE) performed by a base station according to an embodiment of the present disclosure.

FIG. 5 illustrates a method 300 of identifying a user equipment (UE) performed by a base station according to an embodiment of the present disclosure. In some embodiments, the method 300 includes: a block 302, processing, by the base station, a configuration associated with the UE, a UE-specific early identification, or a UE capability information, wherein processing the configuration associated with the UE comprises configuring, by the base station, the configuration associated with the UE to the UE; or processing the UE-specific early identification or the UE capability information comprises receiving or not receiving, by the base station from the UE, the UE-specific early identification or the UE capability information; and a block 304, when the configuration associated with the UE is processed by the base station, the method further comprises performing, by the base station, a random access (RA) procedure using the configuration associated with the UE, wherein a UE type of the UE is identified in the RA procedure by the base station; or when the UE-specific early identification or the UE capability information is processed by the base station, the method further comprises processing a report of the UE type of the UE, wherein the report of the UE type of the UE is triggered by the base station or triggered by the UE. This can solve issues in the prior art, reach early identification of the UE, realize coverage compensation, provide different schedules for different UE types, provide a good communication performance, and/or provide high reliability.

In an embodiment of the present disclosure, the UE type of the UE is a reduced capability (Redcap) UE or a regular UE. In an embodiment of the present disclosure, when processing the UE-specific early identification or the UE capability information comprises not transmitting, by the UE to the base station, the UE-specific early identification or the UE capability information, the base station assumes the UE as the regular UE. For example, if the UE does not report the UE-specific information, the base station regards this UE type as the processing scenario of the regular UE. This avoids the situation that a lower version UE or an existing UE will not report this information. The lower version UE or the existing UE refers to a legacy UE. The legacy UE refers to a terminal operating by the current communication standard. In an embodiment of the present disclosure, the configuration associated with the UE comprises at least one of followings: a configuration of first physical random access channel (PRACH) resources, a configuration of a first initial uplink (UL) bandwidth part (BWP), a configuration of a first random access (RA) preamble, or a configuration of first physical uplink shared channel (PUSCH) resources. In an embodiment of the present disclosure, the RA procedure comprises at least one of the followings: a 4-step RA type, or a 2-step RA type.

In an embodiment of the present disclosure, the 4-step RA type comprises the UE transmitting a message 1 (MSG1) on the first PRACH resources in the dedicated UL BWP or the first initial UL BWP, and the MSG1 comprises the first RA preamble. In an embodiment of the present disclosure, the 2-step RA type comprises the UE transmitting a message A (MSGA) on the first PRACH resources in the first initial UL BWP and the first PUSCH resources, and the MSG A comprises the first RA preamble and a payload. In an embodiment of the present disclosure, the first RA preamble is transmitted on the first PRACH resources in the first initial UL BWP, and the payload is transmitted on the first PUSCH resources. In an embodiment of the present disclosure, the first PUSCH resources are associated with the first PRACH resources. In an embodiment of the present disclosure, the RA procedure comprises a contention-based random access procedure (CBRA) and/or a contention-free random access procedure (CFRA).

In an embodiment of the present disclosure, the configuration associated with the UE is provided to the UE on a system information or a radio resource control (RRC) signaling, the system information or the RRC signaling comprises a new information element (IE) or a field of an existing IE, the system information comprises a master information block (MIB) or a system information block (SIB), and the new IE or the field of the existing IE comprises RACH-ConfigCommon and/or RACH-ConfigCommonTwoStepRA and/or MSGA-ConfigCommon and/or numberOfRA-PreamblesGroupA and/or totalNumberOfRA-Preambles and/or MsgA-ConfigCommon IE and/or MsgA-PUSCH-Config IE. In an embodiment of the present disclosure, the configuration of the first RA preamble comprises CBRA preambles and CFRA preambles, and the CBRA preambles comprises a group A and a group B. In an embodiment of the present disclosure, the CBRA preambles and the CFRA preambles of the Redcap UE are interlaced with or separated from CBRA preambles and CFRA preambles of the regular UE. In an embodiment of the present disclosure, when multiple Redcap UE types are defined, RA preambles of each Redcap UE type are interlaced with or separated from each other. In an embodiment of the present disclosure, M fields are introduced to partition the group A of the CBRA preambles, the group B of the CBRA preambles, and the CFRA preambles into sections of the Redcap UE and the regular UE, respectively, and a number of M is related to a number of Redcap UE types or one Redcap UE type.

In an embodiment of the present disclosure, M is 3 if there is a single Redcap UE type, and/or M is 6 if there are two Redcap UE types. In an embodiment of the present disclosure, fields are introduced to indicate a number of corresponding preambles of the regular UE if there is a single Redcap UE type. In an embodiment of the present disclosure, the fields are introduced to indicate a number of CBRA preambles of the regular UE per synchronous signal block (SSB) in the group A, if there is no field, all CBRA preambles in the group A are available for the regular UE or the Redcap UE. In an embodiment of the present disclosure, the fields are introduced to indicate a number of CBRA preambles of the regular UE per SSB in the group B, if there is no field, all CBRA preambles in the group B are available for the regular UE or the Redcap UE. In an embodiment of the present disclosure, the fields are introduced to indicate a number of CFRA preambles of the regular UE, if there is no field, all CFRA preambles are available for the regular UE or the Redcap UE.

In an embodiment of the present disclosure, fields are introduced to indicate a number of corresponding preambles of the Redcap UE if there are two Redcap UE types.

In an embodiment of the present disclosure, the fields are introduced to indicate a number of CBRA preambles of the first Redcap UE type per SSB in the group A and/or a number of CBRA preambles of the second Redcap UE type per SSB in the group A, and/or the fields are introduced to indicate a number of CBRA preambles of the first Redcap UE type per SSB in the group B and/or a number of CBRA preambles of the second Redcap UE type per SSB in the group B, and/or the fields are introduced to indicate a number of CFRA preambles of the first Redcap UE type and/or a number of CFRA preambles of the second Redcap UE type. In an embodiment of the present disclosure, the configuration of PRACH resources comprises a number of PRACH occasions (POs), an offset of the lowest PO in frequency domain with respective to PRB 0, and/or a PRACH configuration index. In an embodiment of the present disclosure, for frequency domain multiplexed (FDMed) POs, POs of the Redcap UE and POs of the regular UE are interlaced with or separated from each other, and if multiple Redcap UE types are defined, POs of each Redcap UE type are interlaced with or separated from each other.

In an embodiment of the present disclosure, for time domain multiplexed (TDMed) POs, POs of the Redcap UE and POs of the regular UE are interlaced with or separated from each other, and if multiple Redcap UE types are defined, POs of each Redcap UE type are interlaced with or separated from each other. In an embodiment of the present disclosure, POs of the Redcap UE and POs of the regular UE are separated from each other on frequency domain but interlaced with each other on time domain; or the POs of the Redcap UE and the POs of the regular UE are interlaced with each other both on frequency domain and time domain; or the POs of the Redcap UE and the POs of the regular UE are separated from each other both on frequency domain and time domain; or the POs of the Redcap UE and the POs of the regular UE are separated from each other on time domain but interlaced with each other on frequency domain.

In an embodiment of the present disclosure, for the configuration of the first PRACH resources, if the base station supports deployment of Redcap UEs, the base station provides RedcapUE-related PRACH resources configurations on a system information or an RRC; the UE decodes the SI or the RRC and acquires contents comprises PRACH resources configurations for Redcap UEs; the UE selects a suitable PO to transmit a preamble based on an respective UE type; according to a frequency domain location and/or a time domain location of the selected PO, the base station identities the UE type; and the base station schedules an RAR and subsequent messages within transmission capability of the respective UE type. In an embodiment of the present disclosure, for the configuration of the first initial UL BWP, if the base station supports deployment of Redcap UEs, the base station provide RedcapUE-related initial UL BWP configurations on a system information or an RRC, the UE decodes the SI or the RRC and acquires contents comprising initial UL BWP configurations for Redcap UEs, the UE selects an initial UL BWP corresponding to the respective UE type to transmit the preamble; according to frequency domain and a bandwidth of a respective bandwidth part, the base station identities the UE type, and the base station schedules subsequent messages within transmission capability of the respective UE type. In an embodiment of the present disclosure, for the configuration of the first PUSCH resources, if the base station supports deployment of Redcap UEs and a 2-step RA, the base station provides RedcapUE-related MSGA PUSCH configurations on a system information or an RRC, the UE decodes the SI or the RRC and acquires contents comprises MSGA PUSCH configurations for Redcap UEs, the UE selects a MSGA PUSCH corresponding to the respective UE type to transmit a MSGA payload; according to frequency domain and a bandwidth of MSGA PUSCH, the base station identities the UE type, and the base station schedules subsequent messages within transmission capability of the respective UE type.

In an embodiment of the present disclosure, the method further comprises determining, by the UE from the base station, a random access response (RAR) within a transmission capability of the identified UE type. In an embodiment of the present disclosure, the method further comprises transmitting, by the UE to the base station, a post-RAR message or a post message 2 (post-Msg2) comprising the UE-specific early identification or the UE capability information, wherein the UE type of the UE is refreshed by the base station according to the UE-specific early identification or the UE capability information when the UE reports to the base station the UE-specific early identification or the UE capability information and the MSG1 uses specific resources; and determining, by the UE from the base station, a subsequent message within a transmission capability of the refreshed UE type. In an embodiment of the present disclosure, the report of the UE-specific early identification is triggered by the base station or the UE; if the report of the UE-specific early identification is triggered by the base station, the UE gets an early identification command on a downlink (DL) message; if the report of the UE-specific early identification is triggered by the UE, the UE does not need to get the early identification command on the DL message. In an embodiment of the present disclosure, the DL message comprises a MSG2, a MSGB, a MSG4, a UE capability enquiry, or a security mode command, and the early identification command is used to indicate the UE-specific early identification on a MSG3 or a post MSG4. In an embodiment of the present disclosure, the early identification command comprises the respective UE type in which all UEs or only Redcap UEs report the respective UE type and/or fields related to the respective UE type and/or fields independent but piggyback the respective UE type, and the fields of the early identification command are used to inform the all UEs or the Redcap UE to report the respective type to the base station in a subsequent message.

In an embodiment of the present disclosure, the UE-specific early identification is transmitted on a MSGA, or a MSG3, or a post MSG4, or a MSG5, or a UE capability information, or a security mode complete, or a UL information transfer, or a UE information response, or a measurement report. In an embodiment of the present disclosure, a medium access control (MAC) packet data unit (PDU) of the MSG2 and/or the MSGB consists of one or more MAC subPDUs; each MSG2 MAC subPDU consists of one of the followings: a MAC subheader with backoff indicator only; a MAC subheader with random access preamble identifier (RAPID) only; or a MAC subheader with RAPID and MAC RAR. In an embodiment of the present disclosure, each MSGB MAC subPDU consists of one of the followings: a MAC subheader with backoff indicator only; a MAC subheader and fallbackRAR; a MAC subheader and successRAR; a MAC subheader and MAC service data unit (SDU) for common control channel (CCCH) or dedicated control channel (DCCH); or a MAC subheader and padding; each MSGB MAC subPDU consists of one of the followings: a MAC subheader with backoff indicator only; a MAC subheader and fallbackRAR; a MAC subheader and successRAR; a MAC subheader and MAC service data unit (SDU) for common control channel (CCCH) or dedicated control channel (DCCH); or a MAC subheader and padding. In an embodiment of the present disclosure, the early identification command is included in the MAC RAR or the MAC SDU and/or the early identification command is carried in the fallbackRAR or the successRAR, and/or a MAC subheader with a logical channel identifier (LCID) only comprises the early identification command used to indicate the UE to report the UE-specific early identification. In an embodiment of the present disclosure, the UE-specific early identification is reported by the UE by a MAC control element (CE), the MAC CE corresponds to a MAC subheader which consisting of header fields R/F/LCID/L, and a UE-specific early identification format is identified by the MAC subheader with the LCID.

In some embodiments, a group A of the CBRA preambles of the regular UE, the group A of the CBRA preambles of the Redcap UE, a group B of the CBRA preambles of the regular UE, the group B of the CBRA preambles of the Redcap UE, the CFRA preambles of the regular UE, and the CFRA preambles of the Redcap UE are arranged in sequence. In some embodiments, the group A of the CBRA preambles of the Redcap UE, a group A of the CBRA preambles of the regular UE, the group B of the CBRA preambles of the Redcap UE, a group B of the CBRA preambles of the regular UE, the CFRA preambles of the Redcap UE, and the CFRA preambles of the regular UE are arranged in sequence. In some embodiments, a group A of the CBRA preambles of the regular UE, the group A of the CBRA preambles of the Redcap UE, the group B of the CBRA preambles of the Redcap UE, a group B of the CBRA preambles of the regular UE, the CFRA preambles of the regular UE, and the CFRA preambles of the Redcap UE are arranged in sequence.

In some embodiments, if a single Redcap UE type is defined, a group A of the CBRA preambles of the regular UE, a group B of the CBRA preambles of the regular UE, the CFRA preambles of the regular UE, the group A of the CBRA preambles of the Redcap UE, the group B of the CBRA preambles of the Redcap UE, and the CFRA preambles of the Redcap UE are arranged in sequence. In some embodiments, if a single Redcap UE type is defined, the group A of the CBRA preambles of the Redcap UE, the group B of the CBRA preambles of the Redcap UE, the CFRA preambles of the Redcap UE, a group A of the CBRA preambles of the regular UE, a group B of the CBRA preambles of the regular UE, and the CFRA preambles of the regular UE are arranged in sequence. In some embodiments, if two Redcap UE types are defined, a group A of the CBRA preambles of the regular UE, a group B of the CBRA preambles of the regular UE, the CFRA preambles of the regular UE, the group A of the CBRA preambles of a first Redcap UE, the group B of the CBRA preambles of the first Redcap UE, the CFRA preambles of the first Redcap UE, the group A of the CBRA preambles of a second Redcap UE, the group B of the CBRA preambles of the second Redcap UE, and the CFRA preambles of the second Redcap UE are arranged in sequence. In some embodiments, if two Redcap UE types are defined, a group A of the CBRA preambles of the regular UE, a group B of the CBRA preambles of the regular UE, the CFRA preambles of the regular UE, the group A of the CBRA preambles of a first Redcap UE, the group A of the CBRA preambles of a second Redcap UE, the group B of the CBRA preambles of the first Redcap UE, the group B of the CBRA preambles of the second Redcap UE, the CFRA preambles of the first Redcap UE, and the CFRA preambles of the second Redcap UE are arranged in sequence.

During MSG1/MSGA Transmission:

In some embodiments, for MSG1/MSGA, a UE transmits a random access preamble through PRACH resources of initial UL BWP configured by a network such as gNB. By configuring separate PRACH resources, separate initial UL BWP, or separate RA preamble for different UE types, the gNB can identify Redcap UEs from regular NR UEs. Further, MSGA includes a payload on PUSCH, by configuring separate PUSCH resources for Redcap UEs, the gNB can identify a redcap UE. For 4-Step RA and/or 2-Step RA, the UE may be provided these configurations on system information (either MIB or SIBs) by higher layer within a new IE(s) or a field(s) of an existing IE (i.e. RACH-ConfigCommon or MSGA-ConfigCommon).

Figure 6:
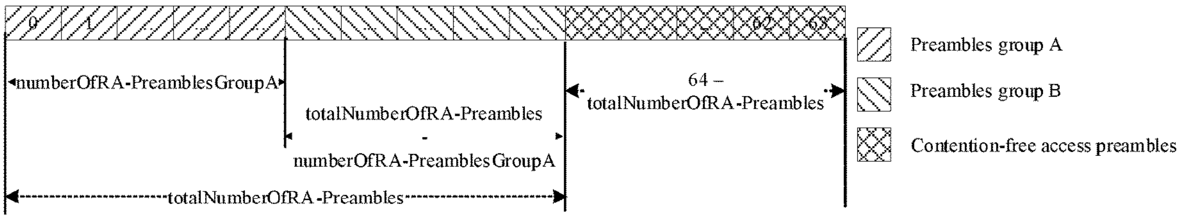
FIG. 6 is a schematic diagram illustrating 4-step RA preambles according to an embodiment of the present disclosure.
Figure 7:
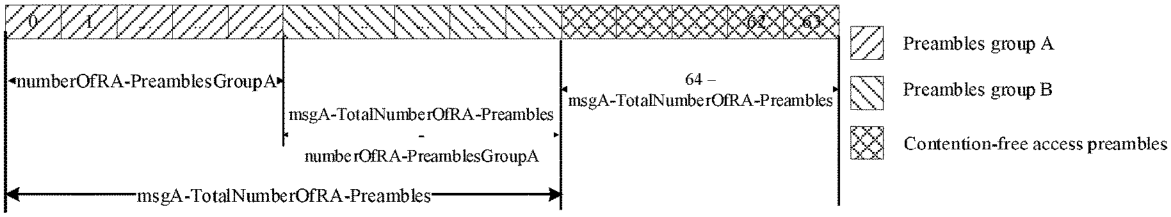
FIG. 7 is a schematic diagram illustrating 2-step RA preambles according to an embodiment of the present disclosure.

Separate RA Preambles:

FIG. 6 illustrates 4-step RA preambles according to an embodiment of the present disclosure. In some embodiments for 4-Step RA, two configurations (totalNumberofRA-Preambles & numberofRA-PreamblesGroupA) can be acquired from RACH-ConfigCommon, which can determine the range of preambles group A, preambles group B, and contention-free access preambles as illustrated in FIG. 6. FIG. 7 illustrates 2-step RA preambles according to an embodiment of the present disclosure. The preambles partitioning of 2-Step RA is similar to 4-Step RA, as illustrated in FIG. 7. As described in the FIG. 6 and FIG. 7, the preambles of each cell are divided into 3 sections (group A, group B, and CFRA preambles) by two fields of RACH-ConfigCommon and RACH-ConfigCommonTwoStepRA. The purpose of partitioning the CBRA preambles into group A and group B is to add certain prior information of MSG3, so that the gNB allocates an appropriate UL resource for MSG3 in RAR. If the potential MSG3 is greater than a certain threshold, and path loss is less than another certain threshold, the preambles group A will be selected. Otherwise, preambles group B will be selected. If there is no preamble grouping mechanism, the network such as the gNB should allocate more UL resources for MSG3, which may cause the loss of UL spectrum efficiency.

Figure 8:
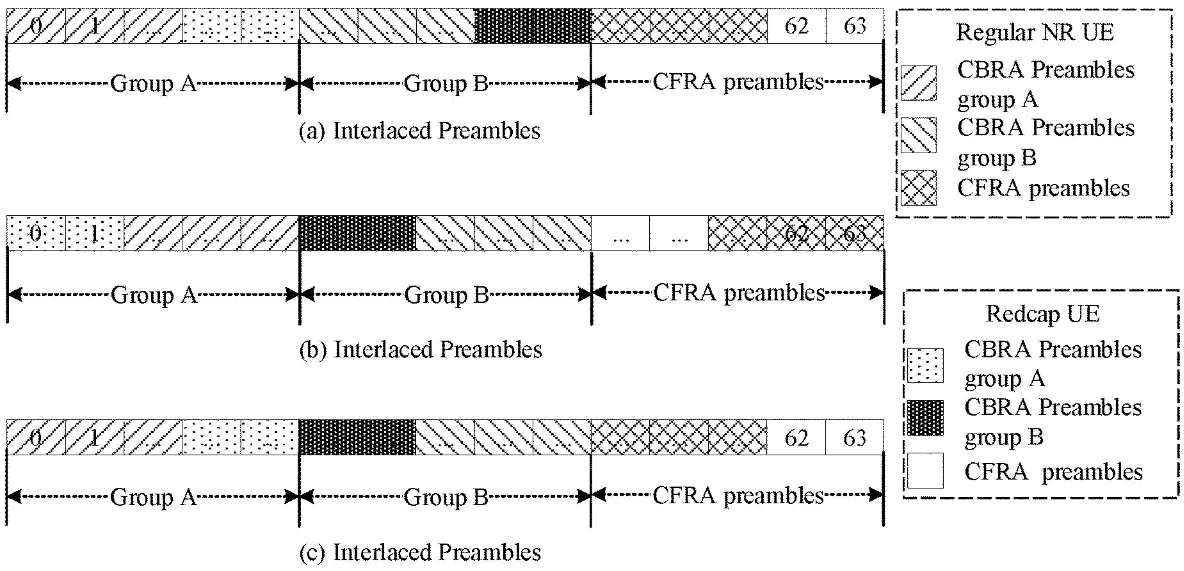
FIG. 8 is a schematic diagram illustrating examples of interlaced preambles according to an embodiment of the present disclosure.

The following embodiments will introduce methods for configuring separate preambles for Redcap UEs. FIG. 8 illustrates examples of interlaced preambles according to an embodiment of the present disclosure. The preambles for regular UE and Redcap UE are interlaced in each preamble section and the interlaced ways in each section can be different, as illustrated in FIG. 8. FIG. 8 (*a*) illustrates that, in some embodiments, a group A of the CBRA preambles of the regular UE, the group A of the CBRA preambles of the Redcap UE, a group B of the CBRA preambles of the regular UE, the group B of the CBRA preambles of the Redcap UE, the CFRA preambles of the regular UE, and the CFRA preambles of the Redcap UE are arranged in sequence. FIG. 8 (*b*) illustrates that, in some embodiments, the group A of the CBRA preambles of the Redcap UE, a group A of the CBRA preambles of the regular UE, the group B of the CBRA preambles of the Redcap UE, a group B of the CBRA preambles of the regular UE, the CFRA preambles of the Redcap UE, and the CFRA preambles of the regular UE are arranged in sequence. FIG. 8 (*c*) illustrates that, in some embodiments, a group A of the CBRA preambles of the regular UE, the group A of the CBRA preambles of the Redcap UE, the group B of the CBRA preambles of the Redcap UE, a group B of the CBRA preambles of the regular UE, the CFRA preambles of the regular UE, and the CFRA preambles of the Redcap UE are arranged in sequence.

Figure 9:
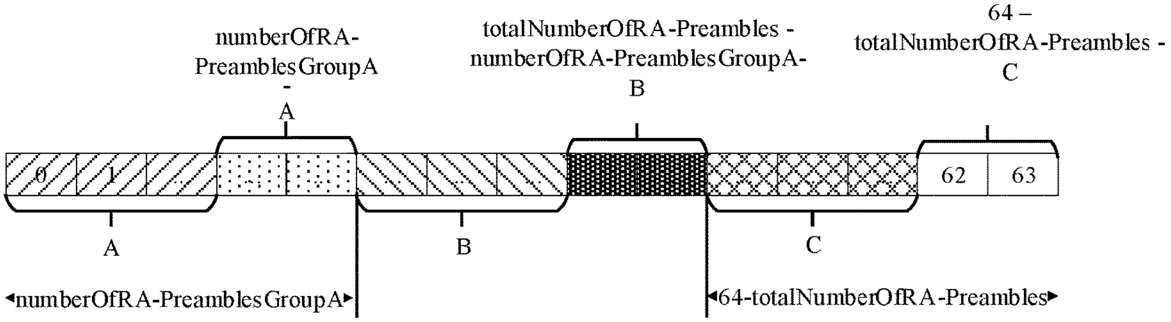
FIG. 9 is a schematic diagram illustrating an example of interlaced preambles according to an embodiment of the present disclosure.

FIG. 9 illustrates an example of interlaced preambles according to an embodiment of the present disclosure. FIG. 9 illustrates that, in some embodiments, M new fields (e.g. A, B, and C) will be introduced to partitioning the preambles group A, preambles group B, and CF preambles into the section of regular NR UEs and the section of Redcap UEs, respectively. The number of M is related to the number of Redcap UE types. For example, M is 3 if a single Redcap UE type, and M is 6 if two Redcap UE types. In some embodiments, new fields indicate the number of corresponding preambles of regular NR UE. Assume a single Redcap UE type for an example.

A: Indicate the number of CB preambles of regular NR UE per SSB in group A. Implicitly, the number of CB preambles of Redcap UE in group A is: (numberofRA-PreamblesGroupA−A) for 4-step RA, and (msgA-TotalNumberOfRA-Preambles−A) for 2-step RA. Optionally, if the field is absent, all CB preambles in group A are available for regular NR UE. Optionally, if the field is absent, all CB preambles in group A are available for redcap UE.

B: Indicate the number of CB preambles of regular NR UE per SSB in group B. Implicitly, the number of CB preambles of Redcap UE in group B is (totalNumberOfRA-Preambles−numberofRA-PreamblesGroupA−B) for 4-step RA, and (msgA-TotalNumberOfRA-Preambles−msgA-TotalNumberOfRA−Preambles−B) for 2-step RA. Optionally, if the field is absent, all CB preambles in group B are available for regular NR UE. Optionally, if the field is absent, all CB preambles in group B are available for redcap UE.

C: Indicate the number of CFRA preambles of regular NR UE. Implicitly, the number of CFRA preambles of Redcap UE is (64−totalNumberOfRA-Preambles−numberofRA-PreamblesGroupA−C) for 4-step RA, and (64−msgA-TotalNumberOfRA-Preambles−C) for 2-step RA. Optionally, if the field is absent, all CF preambles are available for regular NR UE. Optionally, if the field is absent, all CF preambles are available for redcap UE.

Figure 10:
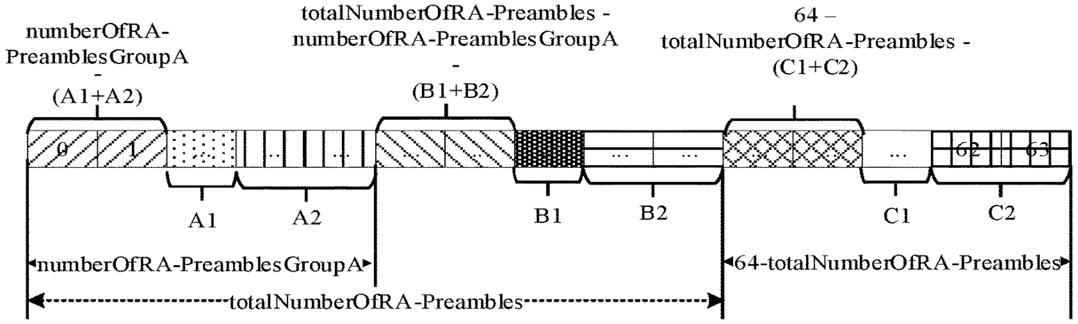
FIG. 10 is a schematic diagram illustrating an example of interlaced preambles according to an embodiment of the present disclosure.

FIG. 10 illustrates an example of interlaced preambles according to an embodiment of the present disclosure. FIG. 9 illustrates that, in some embodiments, new fields indicate the number of corresponding preambles of Redcap UE. For example, two Redcap UE types defined is assumed, and M is 6. A1: Indicate the number of CB preambles of Recap UE Type #1 per SSB in group A. A2: Indicate the number of CB preambles of Recap UE Type #2 per SSB in group A. B1: Indicate the number of CB preambles of Recap UE Type #1 per SSB in group B. B2: Indicate the number of CB preambles of Recap UE Type #2 per SSB in group B. C1: Indicate the number of CFRA preambles of Recap UE Type #1. C2: Indicate the number of CFRA preambles of Recap UE Type #2.

Figure 11:
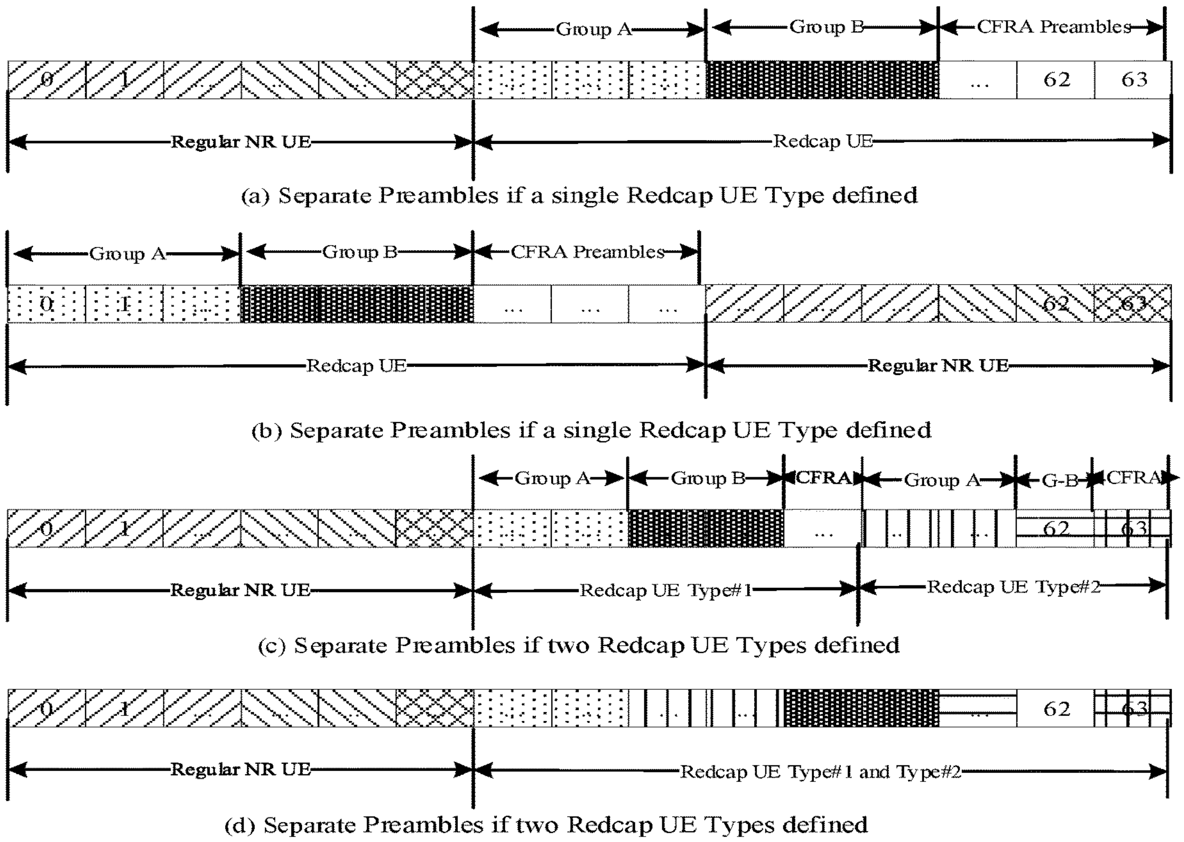
FIG. 11 is a schematic diagram illustrating examples of separate preamble sections according to an embodiment of the present disclosure.

FIG. 11 illustrates examples of separate preamble sections according to an embodiment of the present disclosure. In some embodiments, the preambles for regular UEs and Redcap UEs are separated, as illustrated in FIG. 11. When multiple Redcap UE Types are defined, the preambles of each Redcap UE type may be interlaced or separated, as illustrated in FIG. 11(*c*) and FIG. 11(*d*). FIG. 11 (*a*) illustrates that, in some embodiments, if a single Redcap UE type is defined, a group A of the CBRA preambles of the regular UE, a group B of the CBRA preambles of the regular UE, the CFRA preambles of the regular UE, the group A of the CBRA preambles of the Redcap UE, the group B of the CBRA preambles of the Redcap UE, and the CFRA preambles of the Redcap UE are arranged in sequence. FIG. 11 (*b*) illustrates that, in some embodiments, if a single Redcap UE type is defined, the group A of the CBRA preambles of the Redcap UE, the group B of the CBRA preambles of the Redcap UE, the CFRA preambles of the Redcap UE, a group A of the CBRA preambles of the regular UE, a group B of the CBRA preambles of the regular UE, and the CFRA preambles of the regular UE are arranged in sequence. FIG. 11 (*c*) illustrates that, in some embodiments, if two Redcap UE types are defined, a group A of the CBRA preambles of the regular UE, a group B of the CBRA preambles of the regular UE, the CFRA preambles of the regular UE, the group A of the CBRA preambles of a first Redcap UE, the group B of the CBRA preambles of the first Redcap UE, the CFRA preambles of the first Redcap UE, the group A of the CBRA preambles of a second Redcap UE, the group B of the CBRA preambles of the second Redcap UE, and the CFRA preambles of the second Redcap UE are arranged in sequence. FIG. 11 (*d*) illustrates that, in some embodiments, if two Redcap UE types are defined, a group A of the CBRA preambles of the regular UE, a group B of the CBRA preambles of the regular UE, the CFRA preambles of the regular UE, the group A of the CBRA preambles of a first Redcap UE, the group A of the CBRA preambles of a second Redcap UE, the group B of the CBRA preambles of the first Redcap UE, the group B of the CBRA preambles of the second Redcap UE, the CFRA preambles of the first Redcap UE, and the CFRA preambles of the second Redcap UE are arranged in sequence. Similar to the above embodiments, N new fields should be introduced to explicitly or implicitly indicate the number of the corresponding preambles for regular NR UE and each Redcap UE Type.

Figure 12:
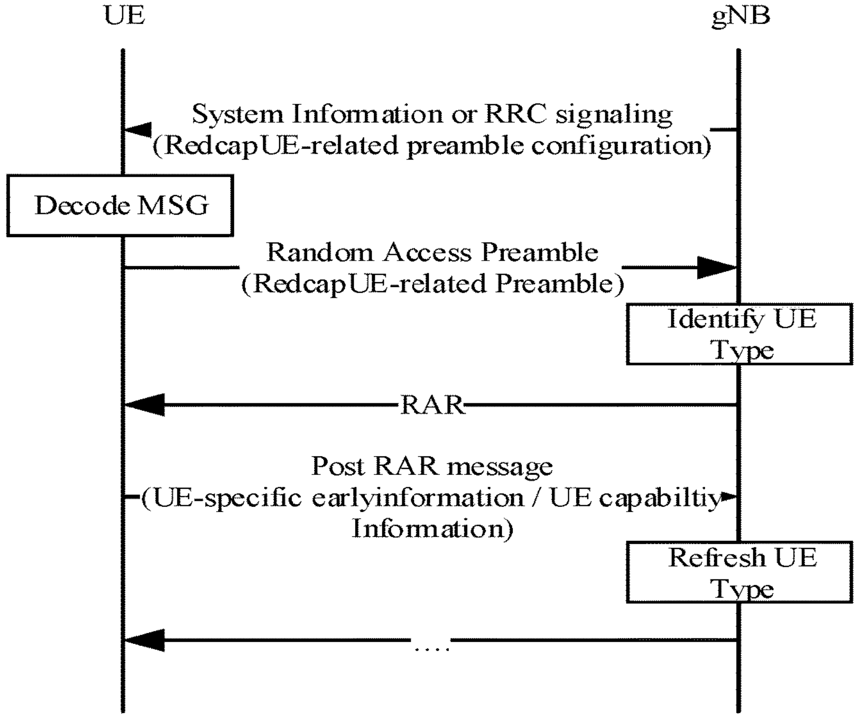
FIG. 12 is a schematic diagram illustrating a method of identifying a UE type from preambles according to an embodiment of the present disclosure.

FIG. 12 illustrates a method of identifying a UE type from preambles according to an embodiment of the present disclosure. FIG. 12 illustrates that, in some embodiments, in an operation, if a gNB supports the deployment of Redcap UEs, the gNB will provide RedcapUE-related preamble configurations on system information(s) or RRC. In an operation, the UE decodes SI(s) (or RRC) and acquires the contents including preamble configurations (e.g. numberOfRA-PreamblesGroupA totalNumberOfRA-Preambles and new fields). Based on its device type and other information, the UE selects a suitable preamble, then transmits the preamble to the gNB. In an operation, according to which partition the preamble belongs to, the gNB identities the UE type (e.g. regular NR UE, a Redcap UE). The gNB schedules RAR and subsequent messages within the transmission capability of the corresponding UE type. In an operation, in post-RAR messages or post message 2 (post-Msg2), the UE may transmit UE-specific early identification or UE capability information to the gNB. In an operation, the gNB may refresh UE type according to UE-specific early information or UE capability information. The gNB schedules subsequent messages within the transmission capability of the refreshed UE type.

Separate PRACH Resources:

In some embodiments, the UE is configured with PRACH resources by higher layer with RACH-ConfigCommon and RACH-ConfigCommonTwoStepRA. The IE(s) is used to specify at least one of the following fields, including: the number of PRACH transmission occasions FDMed in one time instance, offset of lowest PRACH transmission occasion in frequency domain with respective to PRB 0. PRACH configuration index, through the index and the corresponding table in TS 38.211 (see clause 6.3.3.2), some information will be achieved, such as: preamble format, time domain information, etc., or others.

Through FDMed or TDMed PRACH occasions (POs), each type UE can be configured with separated PRACH occasion. RedcapUE-related PRACH resource configurations should be provided by system information (e.g. RACH-ConfigCommon and RACH-ConfigCommonTwoStepRA) or RRC. These resources are not overlap with the PRACH Resources of Regular NR UE. These configurations include at least one of the followings: the number of PRACH transmission occasions FDMed in one time instance for Redcap UE, offset of lowest PRACH transmission occasion in frequency domain with respective to PRB 0 for Redcap UE, PRACH configuration index for Redcap UE, or others.

Figure 13:
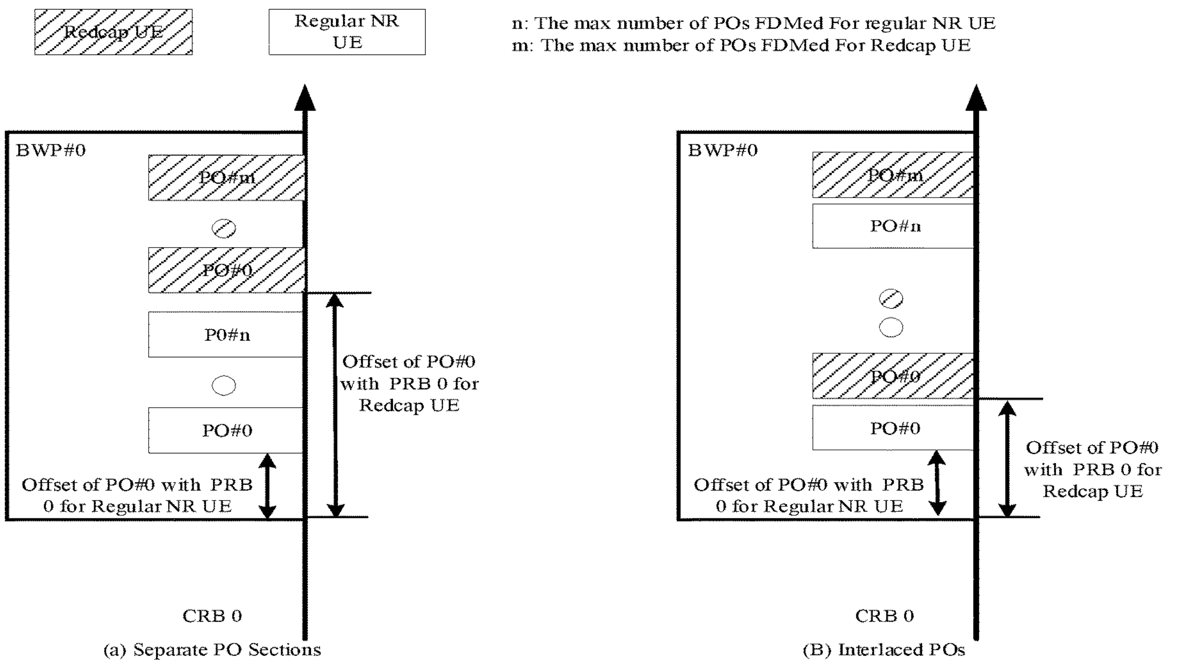
FIG. 13 is a schematic diagram illustrating examples of frequency domain multiplexed (FDMed) physical random access channel (PRACH) occasions for a regular new radio (NR) UE and a reduced capability (Redcap) UE according to an embodiment of the present disclosure.

FIG. 13 illustrates examples of frequency domain multiplexed (FDMed) physical random access channel (PRACH) occasions for a regular new radio (NR) UE and a reduced capability (Redcap) UE according to an embodiment of the present disclosure. For FDMed POs, there are two methods (as illustrated in FIG. 13): 1. Separate POs section. 2. Interlaced POs. If two Redcap UE types are defined, configuration is similar to the above embodiments.

Figure 14:
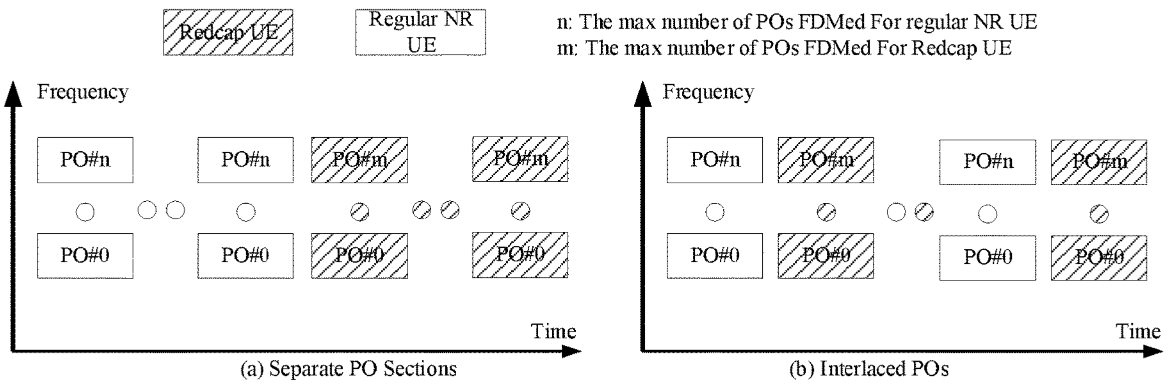
FIG. 14 is a schematic diagram illustrating examples of time domain multiplexed (TDMed) PRACH occasions for a regular NR UE and a Redcap UE according to an embodiment of the present disclosure.

FIG. 14 illustrates examples of time domain multiplexed (TDMed) PRACH occasions for a regular NR UE and a Redcap UE according to an embodiment of the present disclosure. For TDMed POs, there are two methods (as illustrated in FIG. 14): 1. Separate POs section. 2. Interlaced POs. If two Redcap UE types are defined, configuration is similar to the above embodiments.

Figure 15:
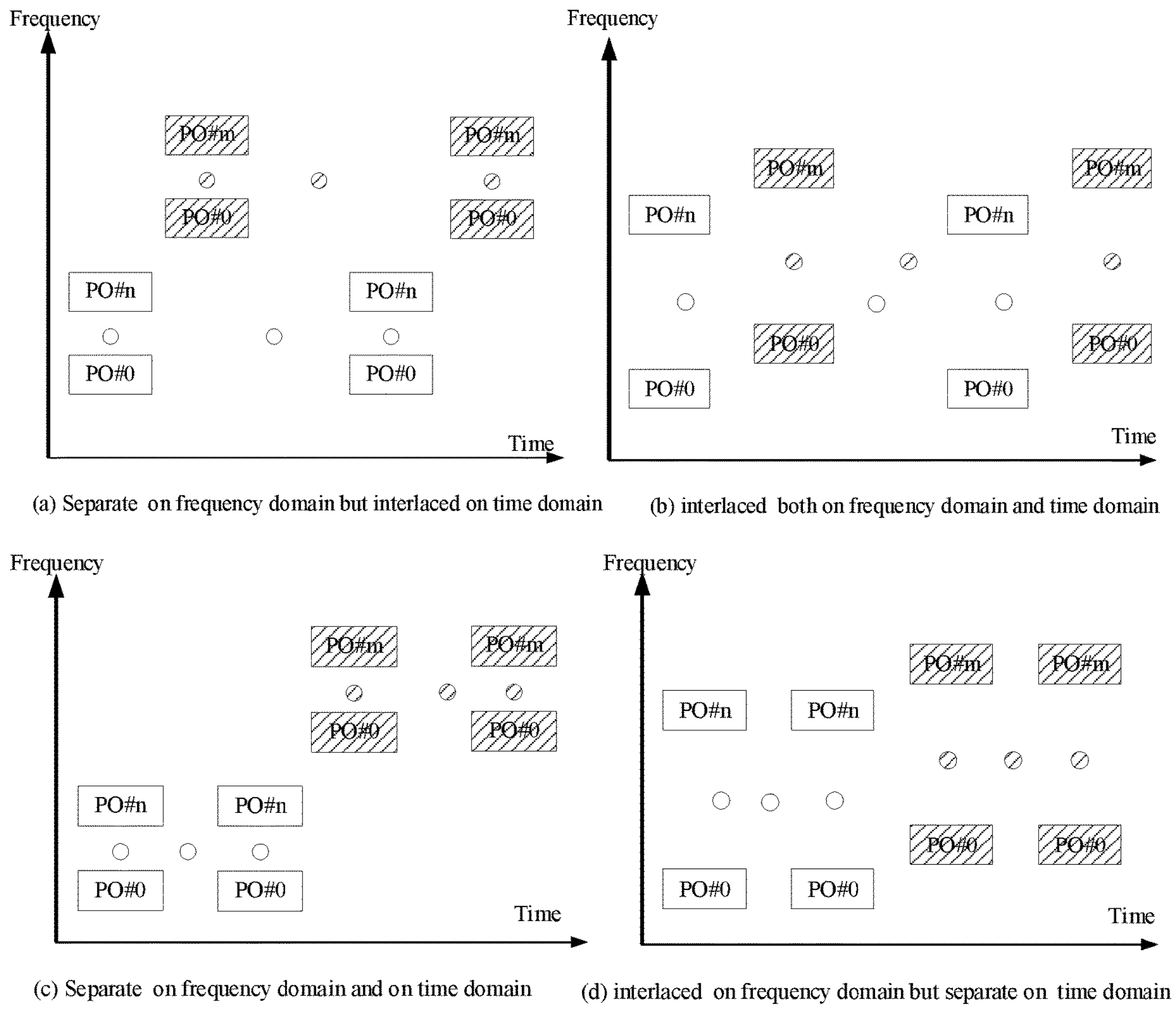
FIG. 15 is a schematic diagram illustrating multiplex PRACH occasions according to an embodiment of the present disclosure.

FIG. 15 illustrates multiplex PRACH occasions according to an embodiment of the present disclosure. In frequency domain and time domain, the multiplexing mode can be mixed, such as: Separate on frequency domain but interlaced on time domain as shown in FIG. 15 (*a*). Interlaced both on frequency and time domain as shown in FIG. 15 (*b*). Separate both on frequency and time domain as shown in FIG. 15 (*c*). Interlaced on frequency domain but separate on time domain as shown in FIG. 15 (*d*).

Figure 16:
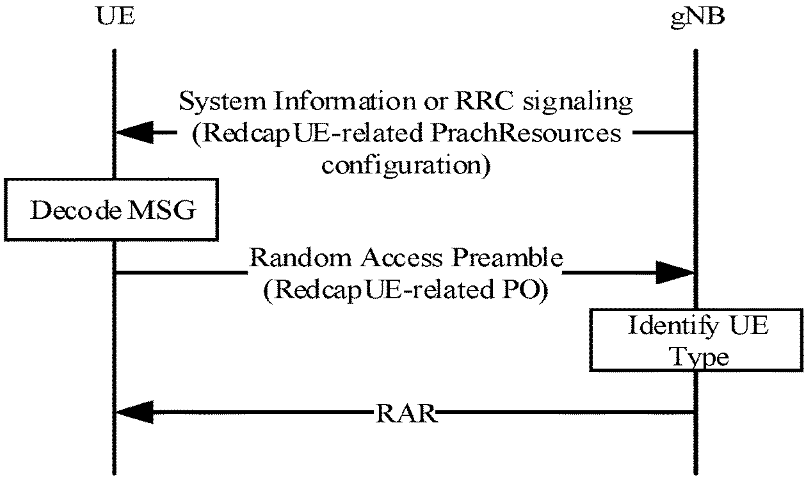
FIG. 16 is a schematic diagram illustrating a method of identifying a UE type from PRACH resources according to an embodiment of the present disclosure.

FIG. 16 illustrates a method of identifying a UE type from PRACH resources according to an embodiment of the present disclosure. FIG. 16 illustrates that, in some embodiments, in an operation, if a gNB supports the deployment of Redcap UEs, the gNB will provide RedcapUE-related PRACH Resources configurations on system information(s) or RRC. In an operation, a UE decodes SI(s) (or RRC) and acquires the contents including PRACH Resources configurations for redcap UEs (e.g. the max number of POs FDMed, PRACH configuration index, Offset of PO #0 with PRB #0). The UE selects a suitable PO to transmit a preamble based on it types. In an operation, according to the frequency domain location and/or time domain location of PO, the gNB identities the UE type (e.g. regular NR UE, a Redcap UE). The gNB schedules RAR and subsequent messages within the transmission capability of the corresponding UE type.

Separate Initial UL BWP:

In some embodiments, relative IE(s) or field(s) can be configured by higher layer for a separate initial UP BWP. For example:

```
UplinkConfigCommonSIB ::= SEQUENCE {
  frequencyInfoUL            FrequencyInfoUL-SIB,
  initialUplinkBWP           BWP-UplinkCommon,
    initialUplinkBWP-RedCap       BWP-UplinkCommon,
    initialUplinkBWP-RedCap#2     BWP-UplinkCommon OPTIONAL, -- Cond RedcapUE
Type#2 defined
    time AlignmentTimerCommon     TimeAlignmentTimer
}
```

initialUplinkBWP-RedCap: The initial uplink BWP configuration for RedcapUE type for a PCel.
initialUplinkBWP-RedCap#2: The initial uplink BWP configuration for RedcapUE type#2 for a PCel, if two Redcap Types are defined.

Figure 17:
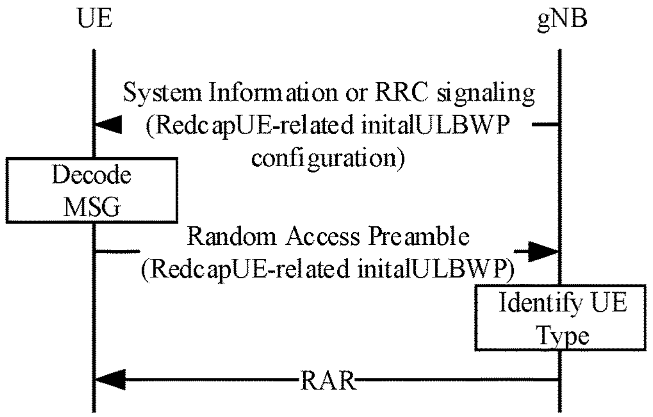
FIG. 17 is a schematic diagram illustrating a method of identifying a UE type from an initial uplink (UL) bandwidth part (BWP) according to an embodiment of the present disclosure.

FIG. 17 illustrates a method of identifying a UE type from an initial uplink (UL) bandwidth part (BWP) according to an embodiment of the present disclosure. FIG. 17 illustrates that, in some embodiments, in an operation, if a gNB supports the deployment of Redcap UEs, the gNB will provide RedcapUE-related initial UL BWP configurations on system information(s) or RRC. In an operation, the U decodes SI(s) (or RRC) and acquires the contents including initial UL BWP configurations for redcap UEs. The UE selects the initial UL BWP corresponding to its type to transmit a preamble. In an operation, according to the frequency domain and bandwidth of this bandwidth part, the gNB identities the UE type (e.g. regular NR UE, a Redcap UE). The gNB schedules subsequent messages within the transmission capability of the corresponding UE type.

Separate MSGA PUSCH:

In some embodiments, MSGA includes a payload on PUSCH. Therefore, by configuring a separate PUSCH resources for Redcap UEs, a gNB can identify UB type. Relative IE(s) or field(s) can be configured by higher layer for initial UP BWP. For example, add a field(s) on MsgA-ConfigCommon TB or MsgA-PUSCH-Config IE:

```
MsgA-ConfigCommon IE:
MsgA-ConfigCommon ::= SEQUENCE {
  rach-ConfigCommonTwoStepRA     RACH-ConfigCommonTwoStepRA,
  msgA-PUSCH-Config              MsgA-PUSCH-Config OPTIONAL,   -- Cond InitialBWPConfig
  msgA-PUSCH-Config-Redcap       MsgA-PUSCH-Config OPTIONAL,   -- Cond RedcapUE Type defined
  msgA-PUSCH-Config-Redcap#2     MsgA-PUSCH-Config OPTIONAL    -- Cond RedcapUE Type#2
defined
}
```

msgA-PUSCH-Config-Redcap: Configuration of cell-specific MsgA PUSCH parameters which the Redcap UE uses for contention-based MsgA PUSCH transmission of this BWP.
msgA-PUSCH-Config-RedCap#2: Configuration of cell-specific MsgA PUSCH parameters which the Redcap UE type#2 uses for contention-based MsgA PUSCH transmission of this BWP, if two Redcap Types are defined.

```
MsgA-PUSCH-Config IE:
MsgA-PUSCH-Config ::= SEQUENCE {
    msgA-PUSCH-ResourceGroup                MsgA-PUSCH-Resource OPTIONAL, -- Cond
InitialBWPConfig
    msgA-PUSCH-ResourceGroupB               MsgA-PUSCH-Resource OPTIONAL, -- Cond
GroupBConfigured
    msgA-PUSCH-ResourceGroup-redcap         MsgA-PUSCH-Resource OPTIONAL, -- Cond
RedcapUE Type defined
    msgA-PUSCH-ResourceGroupB-redcap        MsgA-PUSCH-Resource OPTIONAL, -- Cond RedcapUE
Type defined
    msgA-PUSCH-ResourceGroup-redcap#2       MsgA-PUSCH-Resource OPTIONAL, -- Cond
RedcapUE#2 Type defined
    msgA-PUSCH-ResourceGroupB-redcap#2      MsgA-PUSCH-Resource OPTIONAL, -- Cond RedcapUE#2
Type defined
    msgA-TransformPrecoder                  ENUMERATED { enabled, disabled}
OPTIONAL, -- Need R
    msgA-DataScramblingIndex                INTEGER (0..1023)
OPTIONAL, -- Need S
    msgA-DeltaPreamble                      INTEGER (-1..6)        OPTIONAL -- Need R
}
```

msgA-PUSCH-ResourceGroup-redcap: MsgA PUSCH resources that the RedcapUE shall use when performing MsgA transmission using preambles group A. If field is not con figured for the selected UL BWP, the UE shall use the MsgA PUSCH configuration for group A of initial UL BWP.

msgA-PUSCH-ResourceGroupB-redcap: MsgA PUSCH resources that the Redcap UE shall use when performing MsgA transmission using preambles group B.

msgA-PUSCH-ResourceGroup-redcap#2 : MsgA PUSCH resources that the RedcapUE type#2 shall use when performing MsgA transmission using preambles group A, if two Redcap Types are defined .. If field is not con figured for the selected UL BWP, the UE shall use the MsgA PUSCH configuration for group A of initial UL BWP.

msgA-PUSCH-ResourceGroupB-redcap#2: MsgA PUSCH resources that the Redcap type#2 UE shall use when performing MsgA transmission using preambles group B, if two Redcap Types are defined.

Figure 18:
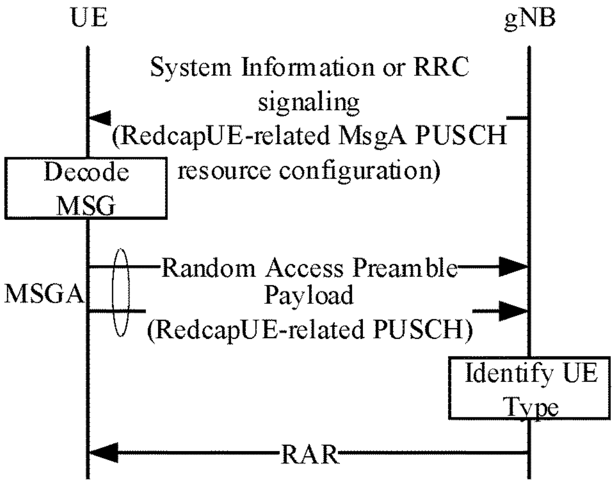
FIG. 18 is a schematic diagram illustrating a method of identifying a UE type from message A (MSGA) physical uplink shared channel (PUSCH) according to an embodiment of the present disclosure.

FIG. 18 illustrates a method of identifying a UE type from message A (MSGA) physical uplink shared channel (PUSCH) according to an embodiment of the present disclosure. FIG. 18 illustrates that, in some embodiments, in an operation, if a gNB supports the deployment of Redcap UEs and 2-step RA, the gNB will provide RedcapUE-related MSGA PUSCH configurations on system information(s) or RRC. In an operation, the UE decodes SI(s) (or RRC) and acquires the contents including MSGA PUSCH configurations for redcap UEs. The UE selects the MSGA PUSCH corresponding to its type to transmit MSGA payload. In an operation, according to the frequency domain and bandwidth of MSGA PUSCH, the gNB identities the UE type (e.g. regular NR UE, a Redcap UE). The gNB schedules subsequent messages within the transmission capability of the corresponding UE type.

UE-Specific Information Transmission:

In some embodiments, the reporting of UE-specific early identification (UE-EI) can be initiated by gNB or triggered by UE itself. If the gNB initiating the report, the UE will get an order from an DL message (e.g. MSG2/MSGB/MSG4/UE capability Enquiry/Security Mode command). An early identification command (EI command) should be defined to indicate UE transmitted UE-specific early identification on MSG3 or post Msg4. The EI command includes: UE type: All UEs or only Redcap UEs should report it. Other field(s): (optional): 1. Some fields related to UE type. 2. Some fields independent but piggyback UE type, such as xDD type (HD-FDD, FDD or TDD).

The corresponding UE-EI should be defined and transmitted on MSGA, MSG3 or post Msg4. This UE-specific information includes UE type: e.g. Redcap Type, Redcap Type #2(--cond two-redcap-types-defined), regular NR UE. Other field(s): The field(s) is mandatory present if a corresponding field(s) is present in the EI command.) xDD type: HD-FDD, FDD or TDD.

Figure 19:
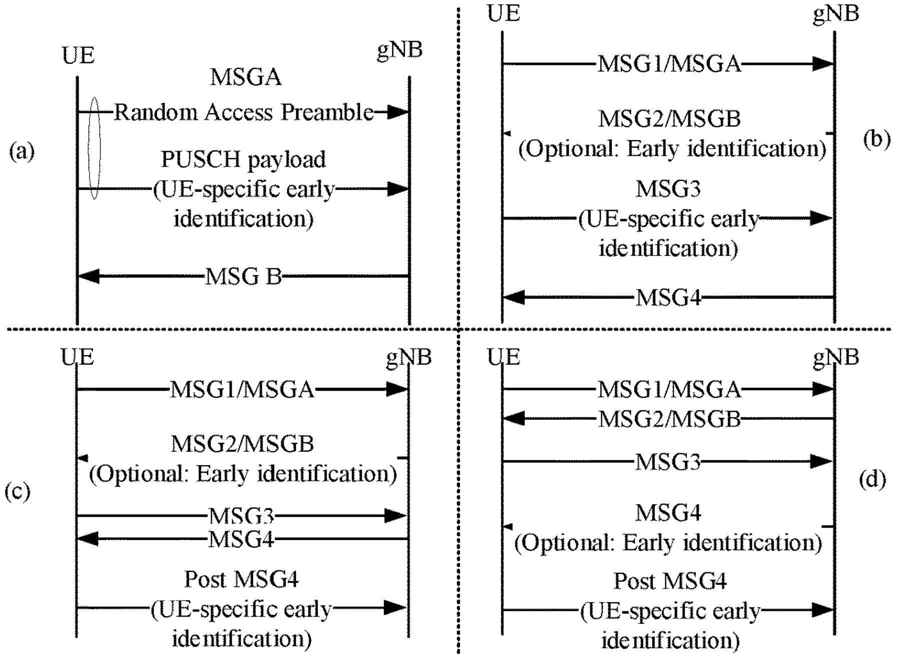
FIG. 19 is a schematic diagram illustrating examples of early identification procedures according to an embodiment of the present disclosure.

FIG. 19 illustrates examples of early identification procedures according to an embodiment of the present disclosure. In Option #1: the reporting trigger by UE. The Redcap UE generates a UE-specific early information carried on MSGA PUSCH or MSG3 or Post-MSG4 messages (e.g. MSG5, UE capability information, Security Mode complete, UL information transfer, UE Information Response, Measurement Report). If UL message consists of UE-specific early information, the gNB identities the UE type and other capabilities according it. Otherwise, the gNB assumes the UE as a regular NR UE. For example, if the UE does not report the UE-specific information, the base station regards this UE type as the processing scenario of the regular UE. This avoids the situation that a lower version UE or an existing UE will not report this information. The lower version UE or the existing UE refers to a legacy UE. The legacy UE refers to a terminal operating by the current communication standard. The gNB schedules subsequent messages within the transmission capability of the corresponding UE type and other capabilities.

In Option #2: the reporting trigger by gNB. If gNB supports the deployment of Redcap UEs and 2-step RA, gNB will provide the EI command on a DL message (e.g. MSG2 or MSGB or MSG4 or UE capability Enquiry/Security Mode command). Redcap UEs decode the MSG and acquires the EI command for redcap UE. UE shall set some UE variables' value according to the contents of the fields in EI command (the number of variables are related to the number of fields in EI command). For example, UE_TYPE=1, XDD_TYPE=1. Redcap UEs generate UE-EI according to the variables' value and carried on subsequent UL messages, e.g. MSG3 or Post-MSG4 messages (MSG5, UE capability information, Security Mode complete, UL information transfer, UE Information Response, Measurement Report). If UL message consists of UE-specific early information, the gNB identities the UE type and other capabilities according it. Otherwise, the gNB assumes the UE as a regular NR UE. The gNB schedules subsequent messages within the transmission capability of the corresponding UE type and other capabilities.

In some embodiments, a MSG2/MSGB MAC PDU consists of one or more MAC subPDUs. Each MSG2 MAC subPDU consists of one of the followings: a MAC subheader with Backoff Indicator only; a MAC subheader with RAPID only (i.e. acknowledgment for SI request); or a MAC subheader with RAPID and MAC RAR. Each MSGB MAC subPDU consists of one of the followings: a MAC subheader with Backoff Indicator only; a MAC subheader and fallbackRAR; a MAC subheader and successRAR; a MAC subheader and MAC SDU for CCCH or DCCH; or a MAC subheader and padding. The EI command may be included in MAC RAR or MAC SDU.

Figure 20:
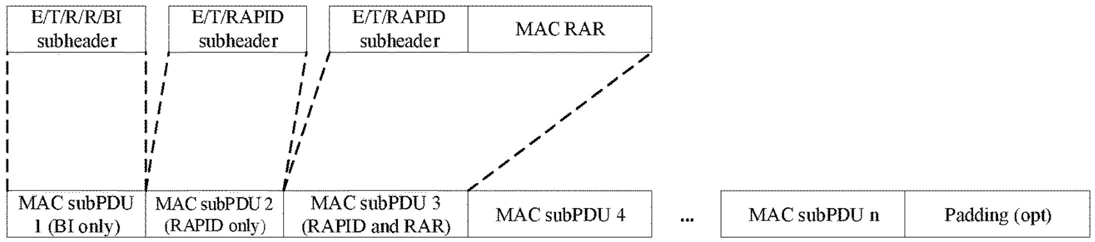
FIG. 20 is a schematic diagram illustrating an example of a medium access control (MAC) packet data unit (PDU) consisting of MAC random access responses (RARs) according to an embodiment of the present disclosure.
Figure 21:
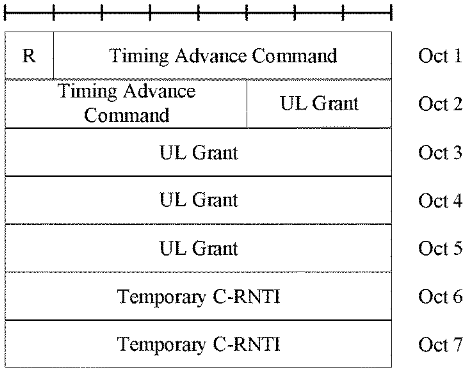
FIG. 21 is a schematic diagram illustrating a MAC RAR according to an embodiment of the present disclosure.
Figure 22:
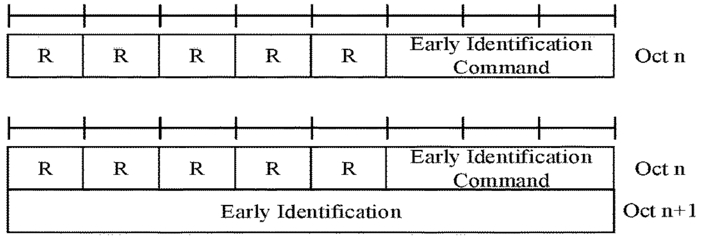
FIG. 22 is a schematic diagram illustrating an early identification command in a MAC RAR according to an embodiment of the present disclosure.

FIG. 20 illustrates an example of a medium access control (MAC) packet data unit (PDU) consisting of MAC random access responses (RARs) according to an embodiment of the present disclosure. FIG. 21 illustrates a MAC RAR according to an embodiment of the present disclosure. FIG. 22 illustrates an early identification command in a MAC RAR according to an embodiment of the present disclosure. The NR MSG2 MAC PDU, defined in the MAC layer protocol standard, is shown in FIG. 20, FIG. 21, and FIG. 22. A MAC PDU consisting of MAC RAR is as described in FIG. 20. A MAC RAR is as described in FIG. 21. The MAC subheader or MAC RAC is octet aligned. The EI command can be defined as shown in FIG. 22 and be carried in MAC RAR.

Figure 23:
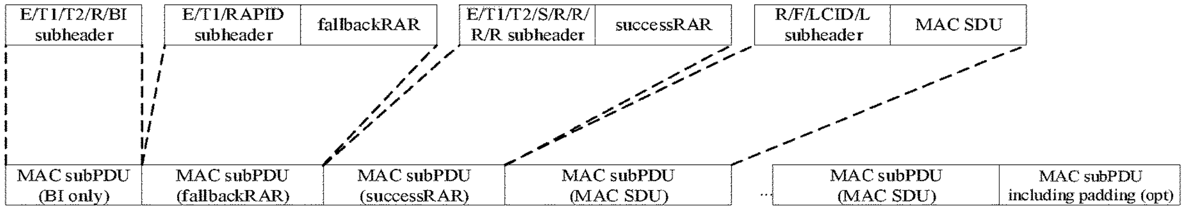
FIG. 23 is a schematic diagram illustrating an example of a MSGB MAC PDU with MAC service data units (SDUs) according to an embodiment of the present disclosure.
Figure 24:
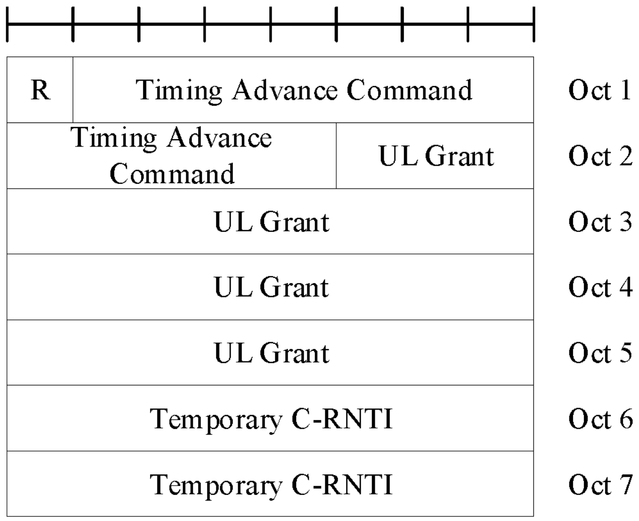
FIG. 24 is a schematic diagram illustrating fallbackRAR according to an embodiment of the present disclosure.
Figure 25:
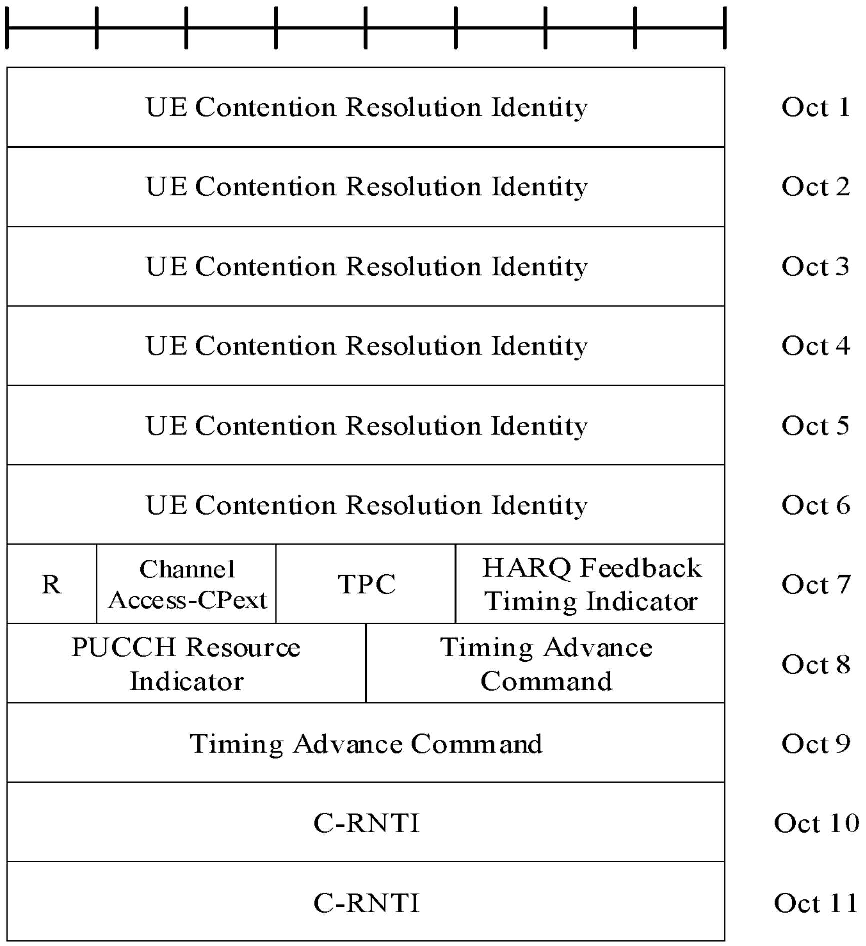
FIG. 25 is a schematic diagram illustrating successRAR according to an embodiment of the present disclosure.

FIG. 23 illustrates an example of a MSGB MAC PDU with MAC service data units (SDUs) according to an embodiment of the present disclosure. FIG. 24 illustrates fallbackRAR according to an embodiment of the present disclosure. FIG. 25 illustrates successRAR according to an embodiment of the present disclosure. The NR MSGB MAC PDU, defined in the MAC layer protocol standard, is shown in FIG. 23, FIG. 24, and FIG. 25. Example of a MSGB MAC PDU with MAC SDUs is as described in FIG. 23. A fallbackRAR is as described in FIG. 24. A successRAR is as described in FIG. 25. The MAC subheader or MAC RAR is octet aligned.

In some embodiments, the following will introduce the methods for transmit EI command. The EI command as shown in FIG. 22 can carried in fallbackRAR or successRAR. A MAC layer provides a service to a radio link control (RLC) layer, which is a superordinate layer through a logical channel. Further, the MAC layer includes a mapping function between the logical channel and the transport channel and a multiplexing/de-multiplexing function to a transport block provided to a physical channel on a transport channel of a MAC service data unit (SDU) that belongs to the logical channel. As shown in FIG. 23, MSGB PDU may consist of one or more MAC SDUs. A MAC SDU corresponds to a MAC subheader which consisting of the header fields R/F/LCID/L. The LCID (Logical Channel ID) field identifies the logical channel instance of the corresponding MAC SDU. In some embodiments, the EI command can be generated by higher layer, and a corresponding LCID should be defined as specified in the following Table 1. A MAC subheader with a LCID as specified in Table 1 only is used to indicate UE to report UE-specific early information.

TABLE 1

Values of LCID for DL-SCH

| Codepoint/ Index | LCID values |
|---|---|
| 0 | CCCH |
| 1-32 | Identity of the logical channel |
| 33 | Extended logical channel ID field (two-octet eLCID field) |
| 34 | Extended logical channel ID field (one-octet eLCID field) |
| 35-45 | Reserved |
| 46 (example) | Early Identification command |
| 47 | Recommended bit rate |
| 48 | SP ZP CSI-RS Resource Set Activation/Deactivation |
| 49 | PUCCH spatial relation Activation/Deactivation |
| 50 | SP SRS Activation/Deactivation |
| 51 | SP CSI reporting on PUCCH Activation/Deactivation |
| 52 | TCI State Indication for UE-specific PDCCH |
| 53 | TCI States Activation/Deactivation for UE-specific PDSCH |
| 54 | Aperiodic CSI Trigger State Subselection |
| 55 | SP CSI-RS/CSI-IM Resource Set Activation/Deactivation |
| 56 | Duplication Activation/Deactivation |
| 57 | SCell Activation/Deactivation (four octets) |
| 58 | SCell Activation/Deactivation (one octet) |
| 59 | Long DRX Command |
| 60 | DRX Command |
| 61 | Timing Advance Command |
| 62 | UE Contention Resolution Identity |
| 63 | Padding |

In some embodiments, as shown in FIG. 22, the EI command can be provided by MSG4. MSG4 is not a specific message, and it varies according to the UE state and application scenario. It may be RRC Setup, RRC Re-establishment, RRC Resume, RRC Reconfiguration, etc. An EarlyIdentification-related IE can be carried in MSG4.

```
Early IdentificationCommand-IEs :: SEQUENCE {
   ueType        BOOLEAN    | BIT STRING (SIZE (1)) | ENUMERATED { true, false } ,
   xddType     BOOLEAN    | BIT STRING (SIZE (1)) | ENUMERATED { true, false } ,
   . . .
}
ueType : If set to true or 1, all UE or only Redcap UEs should report its type. (example)
xddType If set to true or 1, all UE or only Redcap UEs should report its xDD mode. (example)
```

In some embodiments, MSG3/MSG5 is not a specific message, and it varies according to the UE state and application scenario. For example, in initial access of the UE, an RRC connection request may be included and transmitted in MSG3. In RRC connection re-establishment procedure, an RRC connection Re-establishment Request may be included and transmitted in MSG3. MSG3 may be RRC Setup Request, RRC Re-establishment Request, RRC Resume Request, RRC Re-configuration, etc. Accordingly, MSG5 may be RRC Setup complete, RRC Re-establishment complete, RRC Resume complete, RRC Re-configuration complete, etc. Other messages (e.g. UE capability information, Security Mode complete, UL information transfer, UE Information Response, Measurement Report) also can be used to report UE-EI. The related field can be including in a NEW IE or an existing IE(s).
Take a NEW IE as an Example:

```
Assumption: One Redcap UE Type is defined:
1) UeEarlyIdentification-IEs :: SEQUENCE {
    ueType      BOOLEAN | BIT STRING (SIZE (m)) | ENUMERATED {true, false} ,
    xddType       ENUMERATED { FD-FDD, TDD,HD-FDD , spare5, spare4, spare3, spare2, spare1 }
    . . .
}
ueType : If set to true or 1, the UE is a reduced capability UE. If set to 0, the UE is a normal UE. (Example)
2) EarlyIdentificationCommand-IEs :: SEQUENCE {
    ueType      EUMERATED { NormalUE, RedcapUE, spare6, spare5, spare4, spare3, spare2,
spare1 },
    xddType     ENUMERATED { FD-FDD, TDD,HD-FDD , spare5, spare4, spare3, spare2, spare1 }
    . . .
}
Assumption: Two Redcap UE Type are defined:
UeEarlyIdentification-IEs :: SEQUENCE {
    ueType      EUMERATED { NormalUE, RedcapUE#1, RedcapUE#2, spare5, spare4, spare3,
spare2, spare1 } ,
    xddType     ENUMERATED { FD-FDD, TDD, HD-FDD , spare5, spare4, spare3, spare2, spare1 }
    . . .
}
```

Take an existing TB as an example: While using UE capability information to transfer UE-EI, the relative information can be included in UE capability information element. The following is an example:

```
Assumption: One Redcap UE Type is defined:
1) Phy-ParametersCommon :: SEQUENCE {
    ueType      BOOLEAN | BIT STRING (SIZE (m)) | ENUMERATED {true, false} ,
    xddType       ENUMERATED{ FD-FDD, TDD, HD-FDD , spare5, spare4, spare3, spare2, spare1 }
    . . .
}
ueType : If set to true or 1, the UE is a reduced capability UE. If set to 0, the UE is a normal UE. (Example)
2) Phy-ParametersCommon :: SEQUENCE {
    ueType    EUMERATED { NormalUE, RedcapUE, spare6, spare5, spare4, spare3, spare2,
spare1} ,
    xddType   ENUMERATED{ FD-FDD, TDD,HD-FDD , spare5, spare4, spare3, spare2, spare1 }
    . . .
}
Assumption: Two Redcap UE Type are defined:
Phy-ParametersCommon :: SEQUENCE {
    ueType    EUMERATED { NormalUE, RedcapUE#1, RedcapUE#2, spare5, spare4, spare3,
spare2, spare1 } ,
    xddType   ENUMERATED{ FD-FDD, TDD, HD-FDD , spare5, spare4, spare3, spare2, spare1 }
    . . .
}
```

In addition, MSGA, MSG3, MSG5, and Other UL Message can transmit U-EI on its PUSCH resources. UE can report UE-EI by MAC CE. A MAC CE corresponds to a MAC subheader which consisting of the header fields R/F/LCID/L. The LCID (Logical Channel ID) field identifies the logical channel instance of the corresponding MAC CE. The UE-EI MAC CE consist of either: UE Type; xDD Type; or Others. The UE-EI formats are identified by MAC subheaders with LCIDs as specified in the following Table 2.

TABLE 2

Values of LCID for UL-SCH

| Codepoint/ Index | LCID values |
|---|---|
| 0 | CCCH of size 64 bits (referred to as "CCCH1" in TS 38.331 [5]) |
| 1-32 | Identity of the logical channel |
| 33 | Extended logical channel ID field (two-octet eLCID field) |

TABLE 2-continued

Values of LCID for UL-SCH

| Codepoint/ Index | LCID values |
|---|---|
| 34 | Extended logical channel ID field (one-octet eLCID field) |
| 35-43 | Reserved |
| 44 (example) | UE-specific Early Identification |
| 45 | Truncated Sidelink BSR |
| 46 | Sidelink BSR |
| 47 | Reserved |
| 48 | LBT failure (four octets) |
| 49 | LBT failure (one octet) |
| 50 | BFR (one octet $C_i$) |
| 51 | Truncated BFR (one octet $C_i$) |
| 52 | CCCH of size 48 bits (referred to as “CCCH” in TS 38.331 [5]) |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

Commercial interests for some embodiments are as follows. 1. Solving issues in the prior art. 2. Reaching early identification of the UE. 3. Realizing coverage compensation. 4. Providing different schedules for different UE types 5. Providing a good communication performance. 6. Providing a high reliability. 7. Some embodiments of the present disclosure are used by 5G-NR chipset vendors, V2X communication system development vendors, automakers including cars, trains, trucks, buses, bicycles, moto-bikes, helmets, and etc., drones (unmanned aerial vehicles), smartphone makers, communication devices for public safety use, AR/VR device maker for example gaming, conference/seminar, education purposes. Some embodiments of the present disclosure are a combination of “techniques/processes” that can be adopted in 3GPP specification to create an end product. Some embodiments of the present disclosure propose technical mechanisms.

Figure 26:
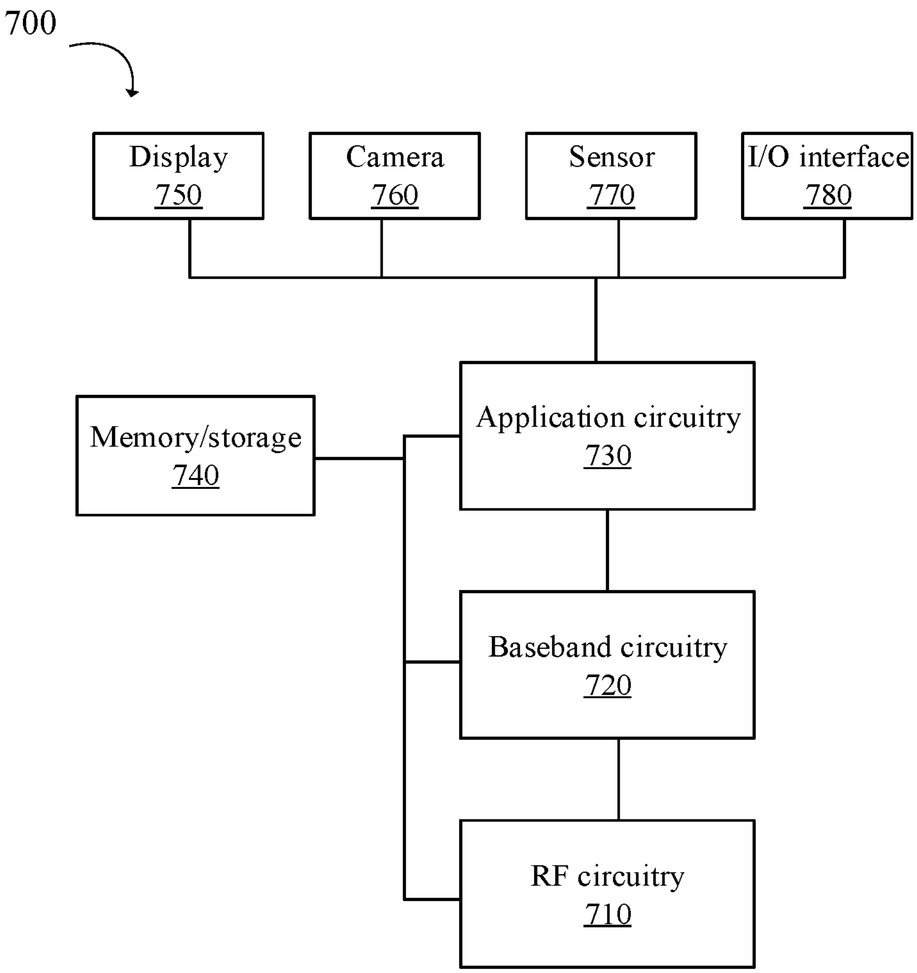
FIG. 26 is a block diagram of a system for wireless communication according to an embodiment of the present disclosure.

FIG. 26 is a block diagram of an example system 700 for wireless communication according to an embodiment of the present disclosure. Embodiments described herein may be implemented into the system using any suitably configured hardware and/or software. FIG. 26 illustrates the system 700 including a radio frequency (RE) circuitry 710, a baseband circuitry 720, an application circuitry 730, a memory/storage 740, a display 750, a camera 760, a sensor 770, and an input/output (I/O) interface 780, coupled with each other at least as illustrated. The application circuitry 730 may include a circuitry such as, but not limited to, one or more single-core or multi-core processors. The processors may include any combination of general-purpose processors and dedicated processors, such as graphics processors, application processors. The processors may be coupled with the memory/storage and configured to execute instructions stored in the memory/storage to enable various applications and/or operating systems running on the system.

The baseband circuitry 720 may include circuitry such as, but not limited to, one or more single-core or multi-core processors. The processors may include a baseband processor. The baseband circuitry may handle various radio control functions that enables communication with one or more radio networks via the RF circuitry. The radio control functions may include, but are not limited to, signal modulation, encoding, decoding, radio frequency shifting, etc. In some embodiments, the baseband circuitry may provide for communication compatible with one or more radio technologies. For example, in some embodiments, the baseband circuitry may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry is configured to support radio communications of more than one wireless protocol may be referred to as multi-mode baseband circuitry.

In various embodiments, the baseband circuitry 720 may include circuitry to operate with signals that are not strictly considered as being in a baseband frequency. For example, in some embodiments, baseband circuitry may include circuitry to operate with signals having an intermediate frequency, which is between a baseband frequency and a radio frequency. The RF circuitry 710 may enable communication with wireless networks using modulated electromagnetic radiation through a non-solid medium. In various embodiments, the RF circuitry may include switches, filters, amplifiers, etc. to facilitate the communication with the wireless network. In various embodiments, the RF circuitry 710 may include circuitry to operate with signals that are not strictly considered as being in a radio frequency. For example, in some embodiments, RF circuitry may include circuitry to operate with signals having an intermediate frequency, which is between a baseband frequency and a radio frequency.

In various embodiments, the transmitter circuitry, control circuitry, or receiver circuitry discussed above with respect to the user equipment, eNB, or gNB may be embodied in whole or in part in one or more of the RF circuitry, the baseband circuitry, and/or the application circuitry. As used herein, “circuitry” may refer to, be part of, or include an Application Specific Integrated Circuit (ASIC), an electronic circuit, a processor (shared, dedicated, or group), and/or a memory (shared, dedicated, or group) that execute one or more software or firmware programs, a combinational logic circuit, and/or other suitable hardware components that provide the described functionality. In some embodiments, the electronic device circuitry may be implemented in, or functions associated with the circuitry may be implemented by, one or more software or firmware modules. In some embodiments, some or all of the constituent components of the baseband circuitry, the application circuitry, and/or the memory/storage may be implemented together on a system on a chip (SOC). The memory/storage 740 may be used to load and store data and/or instructions, for example, for system. The memory/storage for one embodiment may include any combination of suitable volatile memory, such as dynamic random access memory (DRAM)), and/or non-volatile memory, such as flash memory.

In various embodiments, the I/O interface 780 may include one or more user interfaces designed to enable user interaction with the system and/or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface. In various embodiments, the sensor 770 may include one or more sensing devices to determine environmental conditions and/or location information related to the system. In some embodiments, the sensors may include, but are not limited to, a gyro sensor, an accelerometer, a proximity sensor, an ambient light sensor, and a positioning unit. The positioning unit may also be part of, or interact with, the baseband circuitry and/or RF circuitry to communicate with components of a positioning network, e.g., a global positioning system (GPS) satellite.

In various embodiments, the display 750 may include a display, such as a liquid crystal display and a touch screen display. In various embodiments, the system 700 may be a mobile computing device such as, but not limited to, a laptop computing device, a tablet computing device, a netbook, an ultrabook, a smartphone, a AR/VR glasses, etc. In various embodiments, system may have more or less components, and/or different architectures. Where appropriate, methods described herein may be implemented as a computer program. The computer program may be stored on a storage medium, such as a non-transitory storage medium.

A person having ordinary skill in the art understands that each of the units, algorithm, and steps described and disclosed in the embodiments of the present disclosure are realized using electronic hardware or combinations of software for computers and electronic hardware. Whether the functions run in hardware or software depends on the condition of application and design requirement for a technical plan. A person having ordinary skill in the art can use different ways to realize the function for each specific application while such realizations should not go beyond the scope of the present disclosure. It is understood by a person having ordinary skill in the art that he/she can refer to the working processes of the system, device, and unit in the above-mentioned embodiment since the working processes of the above-mentioned system, device, and unit are basically the same. For easy description and simplicity, these working processes will not be detailed.

It is understood that the disclosed system, device, and method in the embodiments of the present disclosure can be realized with other ways. The above-mentioned embodiments are exemplary only. The division of the units is merely based on logical functions while other divisions exist in realization. It is possible that a plurality of units or components are combined or integrated in another system. It is also possible that some characteristics are omitted or skipped. On the other hand, the displayed or discussed mutual coupling, direct coupling, or communicative coupling operate through some ports, devices, or units whether indirectly or communicatively by ways of electrical, mechanical, or other kinds of forms.

The units as separating components for explanation are or are not physically separated. The units for display are or are not physical units, that is, located in one place or distributed on a plurality of network units. Some or all of the units are used according to the purposes of the embodiments. Moreover, each of the functional units in each of the embodiments can be integrated in one processing unit, physically independent, or integrated in one processing unit with two or more than two units.

If the software function unit is realized and used and sold as a product, it can be stored in a readable storage medium in a computer. Based on this understanding, the technical plan proposed by the present disclosure can be essentially or partially realized as the form of a software product. Or, one part of the technical plan beneficial to the conventional technology can be realized as the form of a software product. The software product in the computer is stored in a storage medium, including a plurality of commands for a computational device (such as a personal computer, a server, or a network device) to run all or some of the steps disclosed by the embodiments of the present disclosure. The storage medium includes a USB disk, a mobile hard disk, a read-only memory (ROM), a random access memory (RAM), a floppy disk, or other kinds of media capable of storing program codes.

While the present disclosure has been described in connection with what is considered the most practical and preferred embodiments, it is understood that the present disclosure is not limited to the disclosed embodiments but is intended to cover various arrangements made without departing from the scope of the broadest interpretation of the appended claims.

What is claimed is:

1. A method of identifying a user equipment (UE) performed by the UE, comprising:

performing, by the UE, a random access (RA) procedure, wherein an identification information associated with a UE type of the UE is carried in an uplink message of the RA procedure; and wherein the UE type of the UE is identified based on the identification information by a base station;

wherein the identification information associated with the UE type is a dedicated LCID of a MAC control element (MAC CE), and the MAC CE is carried on a MSGA, or a MSG3, or a post MSG4, or a MSG5, or a UE capability information, or a security mode complete, or a UL information transfer, or a UE information response, or a measurement report.

2. The method of claim 1, wherein the UE type of the UE is a reduced capability, Redcap, UE, a regular UE, or other type UE.

3. The method of claim 2, wherein when processing a UE-specific early identification or a UE capability information comprises not transmitting, by the UE to the base station, the UE-specific early identification or the UE capability information, the base station assumes the UE as the regular UE.

4. The method of claim 3, wherein the RA preamble is a separate preamble section associating with the UE type.

5. The method of claim 1, wherein before performing the RA procedure, the method further comprising:

receiving, by the UE, a configuration associated with the UE comprising at least one of the followings: a configuration of physical random access channel (PRACH) resources, a configuration of an initial uplink bandwidth part, BWP, or a configuration of a random access preamble.

6. The method of claim 5, wherein the configuration of a first preamble section comprises at least one of the followings: a total preamble number, a preamble number of a group A, or a start preamble.

7. The method of claim 5, wherein the configuration of the first RA preamble comprises CBRA preambles, and the CBRA preambles comprises a group A and a group B.

8. The method of claim 7, wherein the CBRA preambles and the CFRA preambles of the Redcap UE are interlaced with or separated from CBRA preambles and CFRA preambles of another UE.

9. The method of claim 8, wherein when multiple Redcap UE types are defined, RA preambles of each Redcap UE type are interlaced with or separated from each other.

10. The method of claim 8, wherein M fields are introduced to partition the group A of the CBRA preambles, the group B of the CBRA preambles, and the CFRA preambles into sections of the Redcap UE and the regular UE, respectively, and a number of M is related to a number of Redcap UE types or one Redcap UE type.

11. The method of claim 10, wherein Mis 3 if there is a single Redcap UE type, and/or M is 6 if there are two Redcap UE types.

12. The method of claim 1, wherein the identification information associated with the UE type is the RA preamble selected by the UE based on UE type and carried in MSG1 FOR 4-step RA or MSGA for 2-step RA.

13. The method of claim 1, wherein the RA procedure comprises a contention-based random access procedure, CBRA, and/or a contention-free random access procedure, CFRA.

14. A user equipment (UE) comprising:

a memory;

a transceiver; and a processor coupled to the memory and the transceiver;

wherein the processor is configured to perform a random access (RA) procedure, wherein an identification information associated with a UE type of the UE is carried in an uplink message of the RA procedure, and the UE type of the UE is identified based on the identification information by a base station;

wherein before the processor performs the RA procedure, the transceiver receives a configuration associated with the UE comprising at least one of the followings: a configuration of physical random access channel (PRACH) resources, a configuration of an initial uplink bandwidth part, BWP, or a configuration of a random access preamble;

wherein the configuration of the first RA preamble comprises CBRA preambles, and the CBRA preambles comprises a group A and a group B;

wherein the CBRA preambles and the CFRA preambles of the Redcap UE are interlaced with or separated from CBRA preambles and CFRA preambles of another UE.

15. The UE of claim 14, wherein when multiple Redcap UE types are defined, RA preambles of each Redcap UE type are interlaced with or separated from each other.

16. The UE of claim 14, wherein M fields are introduced to partition the group A of the CBRA preambles, the group B of the CBRA preambles, and the CFRA preambles into sections of the Redcap UE and the regular UE, respectively, and a number of M is related to a number of Redcap UE types or one Redcap UE type.

17. The UE of claim 14, wherein M is 3 if there is a single Redcap UE type, and/or M is 6 if there are two Redcap UE types.

18. A method of identifying a user equipment (UE) performed by the UE, comprising:

performing, by the UE, a random access (RA) procedure, wherein an identification information associated with a UE type of the UE is carried in an uplink message of the RA procedure; and wherein the UE type of the UE is identified based on the identification information by a base station;

wherein before performing the RA procedure, the method further comprising:

receiving, by the UE, a configuration associated with the UE comprising at least one of the followings: a configuration of physical random access channel (PRACH) resources, a configuration of an initial uplink bandwidth part, BWP, or a configuration of a random access preamble;

wherein the configuration of the first RA preamble comprises CBRA preambles, and the CBRA preambles comprises a group A and a group B;

wherein the CBRA preambles and the CFRA preambles of the Redcap UE are interlaced with or separated from CBRA preambles and CFRA preambles of another UE;

wherein M fields are introduced to partition the group A of the CBRA preambles, the group B of the CBRA preambles, and the CFRA preambles into sections of the Redcap UE and the regular UE, respectively, and a number of M is related to a number of Redcap UE types or one Redcap UE type.

19. The method of claim 18, wherein Mis 3 if there is a single Redcap UE type, and/or M is 6 if there are two Redcap UE types.

20. The method of claim 18, wherein the identification information associated with the UE type is a dedicated LCID of a MAC control element (MAC CE), and the MAC CE is carried on a MSGA, or a MSG3, or a post MSG4, or a MSG5, or a UE capability information, or a security mode complete, or a UL information transfer, or a UE information response, or a measurement report.

* * * * *